United States Patent
Ueda et al.

(10) Patent No.: US 6,804,025 B1
(45) Date of Patent: Oct. 12, 2004

(54) CALIBRATION DATA PREPARING SYSTEM

(75) Inventors: Masashi Ueda, Nagoya (JP); Masahiro Nishihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/534,026

(22) Filed: Mar. 24, 2000

(30) Foreign Application Priority Data

Mar. 24, 1999 (JP) ............................................ 11-079884
Mar. 29, 1999 (JP) ............................................ 11-087217
Mar. 29, 1999 (JP) ............................................ 11-087218

(51) Int. Cl.$^7$ ............................................... H04N 1/46
(52) U.S. Cl. ......................... 358/1.9; 358/504; 358/518
(58) Field of Search ......................... 358/1.9, 501, 504, 358/518, 521, 523, 525; 382/162, 167

(56) References Cited

U.S. PATENT DOCUMENTS 5,065,234 A * 11/1991 Hung et al. .................. 358/523
6,419,340 B1 * 7/2002 Wickham et al. ............. 347/15

FOREIGN PATENT DOCUMENTS

| JP | A-63-254888 | 10/1988 |
| JP | A-3-13066 | 1/1991 |
| JP | B2-2755300 | 3/1998 |

* cited by examiner

*Primary Examiner*—Thomas D. Lee
(74) *Attorney, Agent, or Firm*—Oliff & Berridge, PLC

(57) ABSTRACT

In order to prepare tone characteristic data or calibration data based on measurements of tone levels of four colors by nine tones, the lowest tone level in measured only once using a single patch that is common to all the four colors. As a result, the entire operation time can be reduced by the time that is required to measure three more patches. If there is a considerable gap between the actually-measured output level and a predicted output level (S114:NO), then an error message is displayed (S115). Then, the measurements are performed once again. Therefore, wasteful operations will not be continued with the tone characteristic data in its mistaken form. Instead displaying the error message, the error-occurring output value can be replaced with a value that is determined by interpolating between non-error-occurring output values around the error-occurring output value.

18 Claims, 21 Drawing Sheets

FIG.3(b)

| CALIBRATION DATA d6 ||
|---|---|
| ORIGINAL LEVELS Coriginal | INPUT LEVELS Cin |
| 0 | |
| ⑤ | |
| 255 | |
| CALIBRATION DATA d7 ||
| ORIGINAL LEVELS Moriginal | INPUT LEVELS Min |
| 0 | |
| ⑤ | |
| 255 | |
| CALIBRATION DATA d8 ||
| ORIGINAL LEVELS Yoriginal | INPUT LEVELS Yin |
| 0 | |
| ⑤ | |
| 255 | |
| CALIBRATION DATA d9 ||
| ORIGINAL LEVELS Koriginal | INPUT LEVELS Kin |
| 0 | |
| ⑤ | |
| 255 | |

| MEASUREMENT DATA | |
|---|---|
| INPUT LEVELS $C_{in}$ | OUTPUT LEVELS $C_{out}$ |
| 0 | , |
| ∫ | : |
| 255 | , |
| MEASUREMENT DATA | |
| INPUT LEVELS $M_{in}$ | OUTPUT LEVELS $M_{out}$ |
| 0 | , |
| ∫ | : |
| 255 | , |
| MEASUREMENT DATA | |
| INPUT LEVELS $Y_{in}$ | OUTPUT LEVELS $Y_{out}$ |
| 0 | , |
| ∫ | : |
| 255 | , |
| MEASUREMENT DATA | |
| INPUT LEVELS $K_{in}$ | OUTPUT LEVELS $K_{out}$ |
| 0 | , |
| ∫ | : |
| 255 | , |

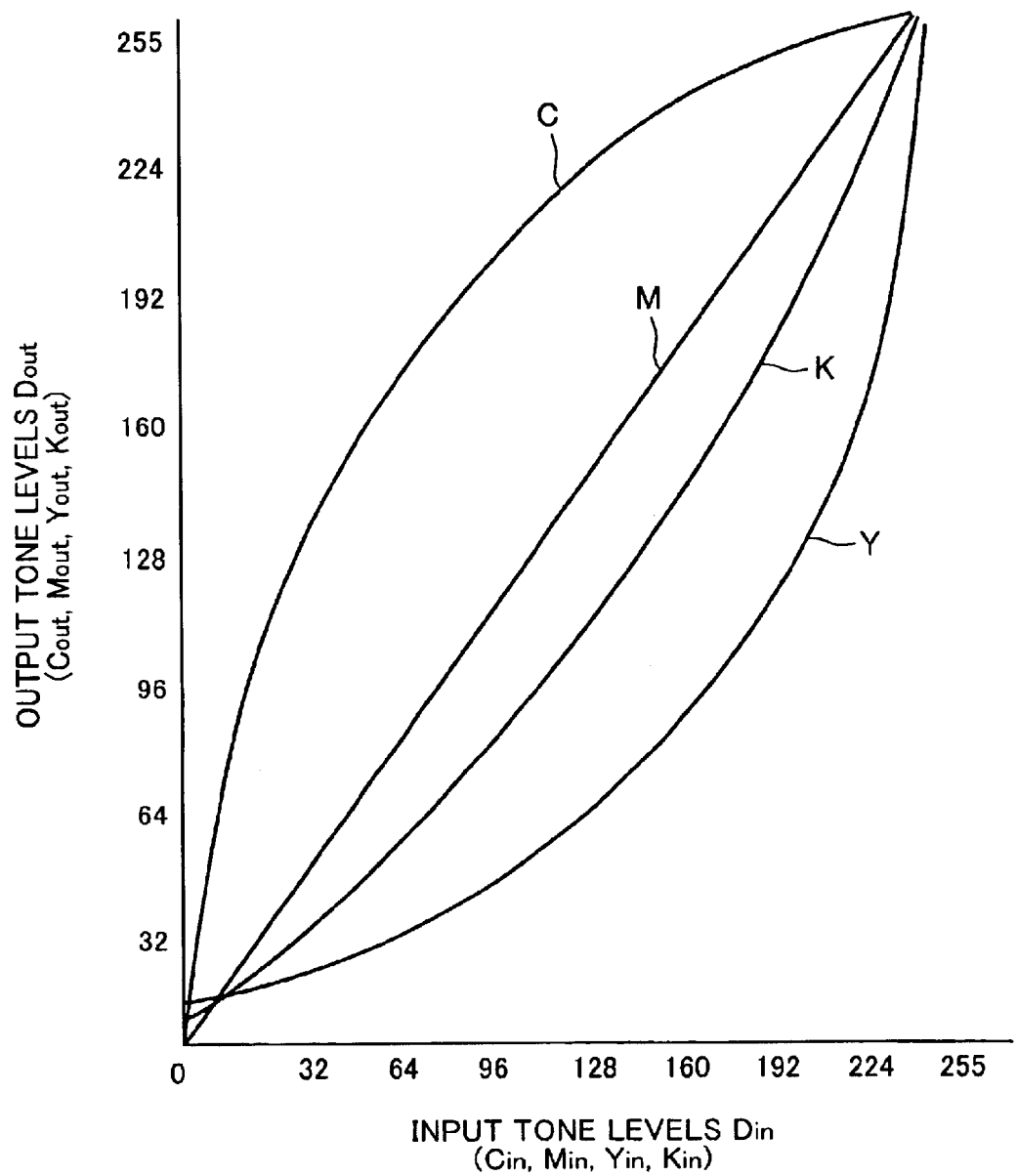

FIG. 10

| ORDER | LEVEL | ORDER | LEVEL | ORDER | LEVEL | ORDER | LEVEL | ORDER | LEVEL | ORDER | LEVEL | ORDER | LEVEL | ORDER | LEVEL |
|---|---|---|---|---|---|---|---|---|---|---|---|---|---|---|---|
| 0 | 0 | 32 | 248 | 64 | 252 | 96 | 126 | 128 | 254 | 160 | 63 | 192 | 127 | 224 | 191 |
| 1 | 255 | 33 | 4 | 65 | 2 | 97 | 130 | 129 | 1 | 161 | 65 | 193 | 129 | 225 | 193 |
| 2 | 128 | 34 | 12 | 66 | 6 | 98 | 134 | 130 | 3 | 162 | 67 | 194 | 131 | 226 | 195 |
| 3 | 64 | 35 | 20 | 67 | 10 | 99 | 138 | 131 | 5 | 163 | 69 | 195 | 133 | 227 | 197 |
| 4 | 192 | 36 | 28 | 68 | 14 | 100 | 142 | 132 | 7 | 164 | 71 | 196 | 135 | 228 | 199 |
| 5 | 32 | 37 | 36 | 69 | 18 | 101 | 146 | 133 | 9 | 165 | 73 | 197 | 137 | 229 | 201 |
| 6 | 96 | 38 | 44 | 70 | 22 | 102 | 150 | 134 | 11 | 166 | 75 | 198 | 139 | 230 | 203 |
| 7 | 160 | 39 | 52 | 71 | 26 | 103 | 154 | 135 | 13 | 167 | 77 | 199 | 141 | 231 | 205 |
| 8 | 224 | 40 | 60 | 72 | 30 | 104 | 158 | 136 | 15 | 168 | 79 | 200 | 143 | 232 | 207 |
| 9 | 16 | 41 | 68 | 73 | 34 | 105 | 162 | 137 | 17 | 169 | 81 | 201 | 145 | 233 | 209 |
| 10 | 48 | 42 | 76 | 74 | 38 | 106 | 166 | 138 | 19 | 170 | 83 | 202 | 147 | 234 | 211 |
| 11 | 80 | 43 | 84 | 75 | 42 | 107 | 170 | 139 | 21 | 171 | 85 | 203 | 149 | 235 | 213 |
| 12 | 112 | 44 | 92 | 76 | 46 | 108 | 174 | 140 | 23 | 172 | 87 | 204 | 151 | 236 | 215 |
| 13 | 144 | 45 | 100 | 77 | 50 | 109 | 178 | 141 | 25 | 173 | 89 | 205 | 153 | 237 | 217 |
| 14 | 176 | 46 | 108 | 78 | 54 | 110 | 182 | 142 | 27 | 174 | 91 | 206 | 155 | 238 | 219 |
| 15 | 208 | 47 | 116 | 79 | 58 | 111 | 186 | 143 | 29 | 175 | 93 | 207 | 157 | 239 | 221 |
| 16 | 240 | 48 | 124 | 80 | 62 | 112 | 190 | 144 | 31 | 176 | 95 | 208 | 159 | 240 | 223 |
| 17 | 8 | 49 | 132 | 81 | 66 | 113 | 194 | 145 | 33 | 177 | 97 | 209 | 161 | 241 | 225 |
| 18 | 24 | 50 | 140 | 82 | 70 | 114 | 198 | 146 | 35 | 178 | 99 | 210 | 163 | 242 | 227 |
| 19 | 40 | 51 | 148 | 83 | 74 | 115 | 202 | 147 | 37 | 179 | 101 | 211 | 165 | 243 | 229 |
| 20 | 56 | 52 | 156 | 84 | 78 | 116 | 206 | 148 | 39 | 180 | 103 | 212 | 167 | 244 | 231 |
| 21 | 72 | 53 | 164 | 85 | 82 | 117 | 210 | 149 | 41 | 181 | 105 | 213 | 169 | 245 | 233 |
| 22 | 88 | 54 | 172 | 86 | 86 | 118 | 214 | 150 | 43 | 182 | 107 | 214 | 171 | 246 | 235 |
| 23 | 104 | 55 | 180 | 87 | 90 | 119 | 218 | 151 | 45 | 183 | 109 | 215 | 173 | 247 | 237 |
| 24 | 120 | 56 | 188 | 88 | 94 | 120 | 222 | 152 | 47 | 184 | 111 | 216 | 175 | 248 | 239 |
| 25 | 136 | 57 | 196 | 89 | 98 | 121 | 226 | 153 | 49 | 185 | 113 | 217 | 177 | 249 | 241 |
| 26 | 152 | 58 | 204 | 90 | 102 | 122 | 230 | 154 | 51 | 186 | 115 | 218 | 179 | 250 | 243 |
| 27 | 168 | 59 | 212 | 91 | 106 | 123 | 234 | 155 | 53 | 187 | 117 | 219 | 181 | 251 | 245 |
| 28 | 184 | 60 | 220 | 92 | 110 | 124 | 238 | 156 | 55 | 188 | 119 | 220 | 183 | 252 | 247 |
| 29 | 200 | 61 | 228 | 93 | 114 | 125 | 242 | 157 | 57 | 189 | 121 | 221 | 185 | 253 | 249 |
| 30 | 216 | 62 | 236 | 94 | 118 | 126 | 246 | 158 | 59 | 190 | 123 | 222 | 187 | 254 | 251 |
| 31 | 232 | 63 | 244 | 95 | 122 | 127 | 250 | 159 | 61 | 191 | 125 | 223 | 189 | 255 | 253 |

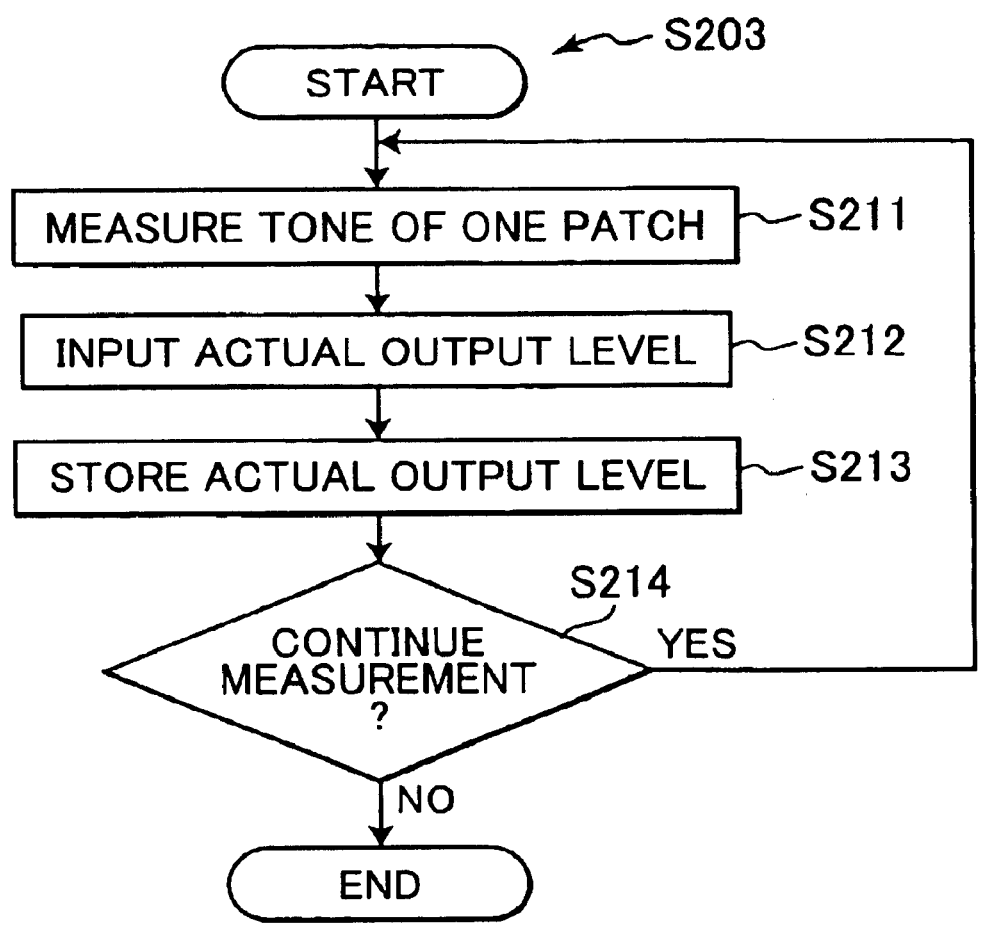

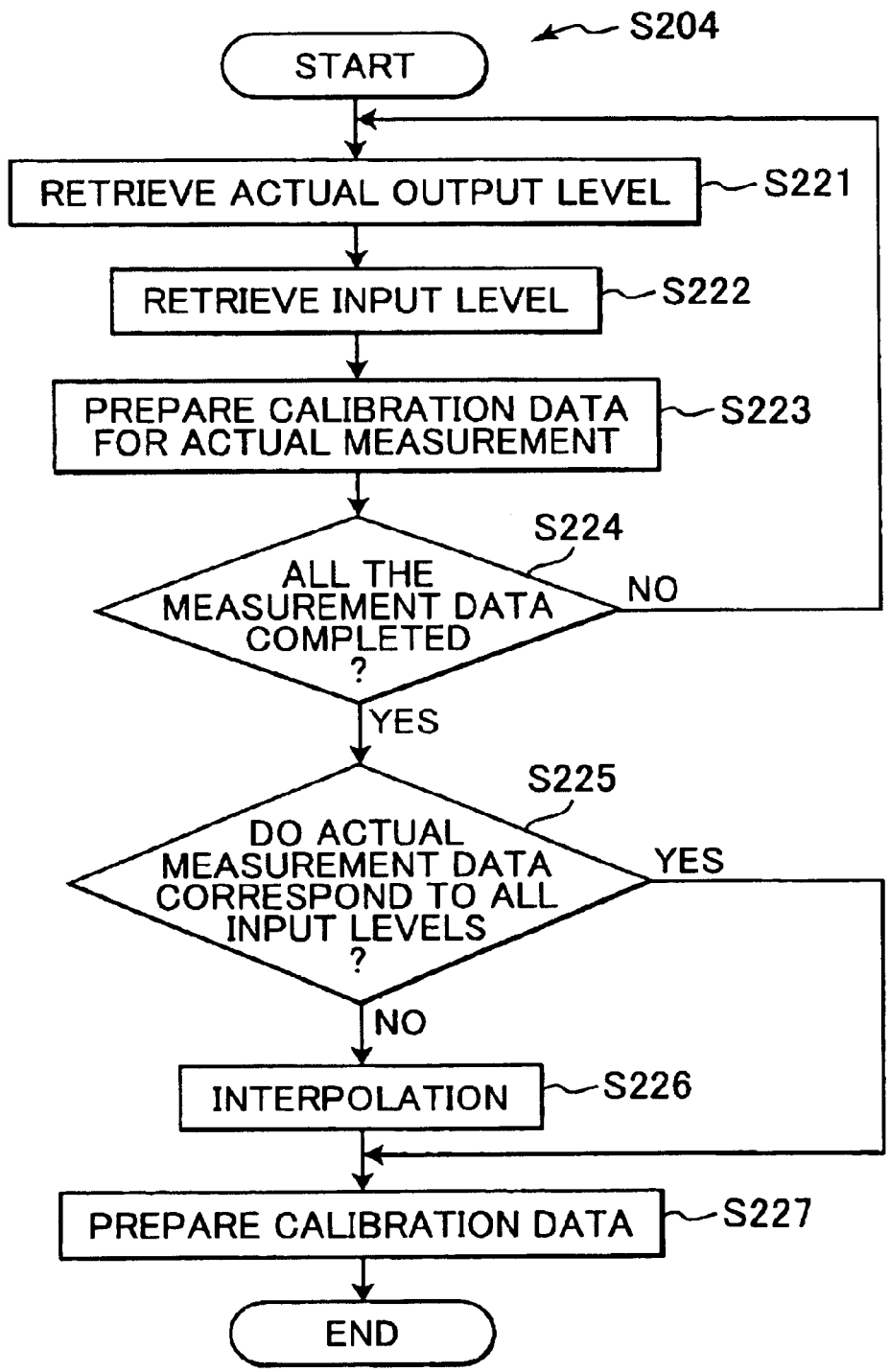

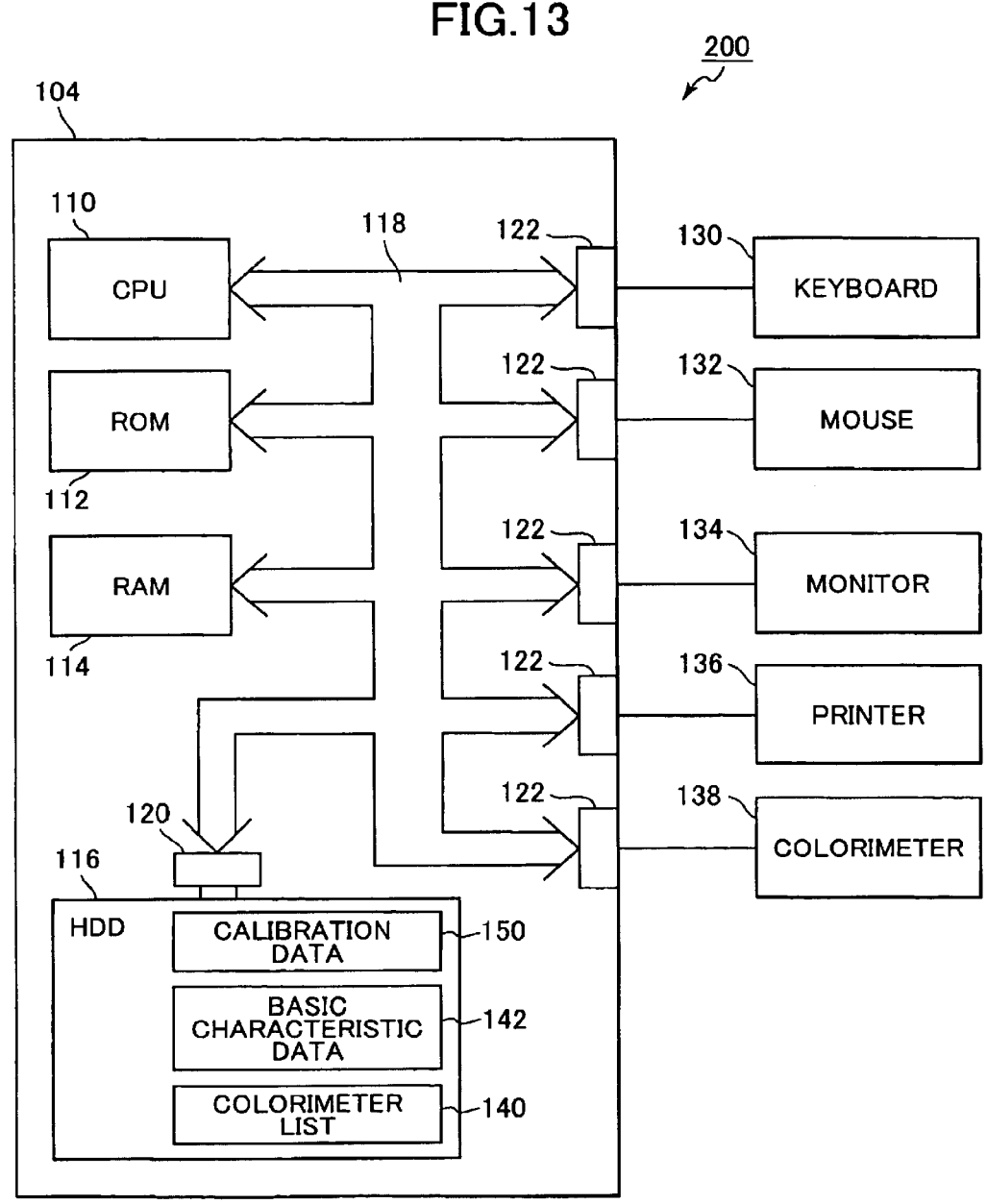

| PATCH NO. | P1 | P2 |
|---|---|---|
| PATCH COORDINATER FOR COLORIMETER (1) (x, y) | x1, y1 | x2, y2 |
| PATCH COORDINATER FOR COLORIMETER (2) (x', y') | x'1, y'1 | x'2, y'2 |
| PATCH COORDINATER FOR COLORIMETER (3) (x", y") | x"1, y"1 | x"2, y"2 |
| . | . | . |
| . | . | . |
| . | . | . |

···

| P254 | P255 | P256 | P257 |
|---|---|---|---|
| x254, y254 | x255, y255 | x256, y256 | x257, y257 |
| x'254, y'254 | x'255, y'255 | x'256, y'256 | x'257, y'257 |
| x"254, y"254 | x"255, y"255 | x"256, y"256 | x"257, y"257 |
| . | . | . | . |
| . | . | . | . |
| . | . | . | . |

···

| P510 | P511 | P512 | P513 |
|---|---|---|---|
| x510, y510 | x511, y511 | x512, y512 | x513, y513 |
| x'510, y'510 | x'511, y'511 | x'512, y'512 | x'513, y'513 |
| x"510, y"510 | x"511, y"511 | x"512, y"512 | x"513, y"513 |
| . | . | . | . |
| . | . | . | . |
| . | . | . | . |

···

| P767 | P768 |
|---|---|
| x767, 767 | x768, y768 |
| x'767, y'767 | x'768, y'768 |
| x"767, y"767 | x"768, y"768 |
| . | . |
| . | . |
| . | . |

FIG.16

| RECORDING MEDIUM | INK | RESOLUTION [dpi] | AREA GRADATION | LUT |
|---|---|---|---|---|
| NORMAL PAPER | NORMAL | 300 | BAYER SPIRAL | 1 2 |
| | | 600 | BAYER SPIRAL | 3 4 |
| | PHOTO INK | 300 | BAYER SPIRAL | 5 6 |
| | | 600 | BAYER SPIRAL | 7 8 |
| | ⋮ | ⋮ | ⋮ | ⋮ |
| COATED PAPER | NORMAL | 300 | BAYER SPIRAL | · |
| | | 600 | BAYER SPIRAL | · |
| | PHOTO INK | 300 | BAYER SPIRAL | · |
| | | 600 | BAYER SPIRAL | · |
| | ⋮ | ⋮ | ⋮ | ⋮ |
| OHP FILM | NORMAL | 300 | BAYER SPIRAL | · |
| | | 600 | BAYER SPIRAL | · |
| | PHOTO INK | 300 | BAYER SPIRAL | · |
| | | 600 | BAYER SPIRAL | · |

| CALIBRATION DATA | |
|---|---|
| ORIGINAL LEVELS $R_{original}$ (RELATIVE DENSITY C) | INPUT LEVELS $R_{in}$ (PIXEL VALUE i) |
| 0 | . |
| ⌇ | ⋮ |
| 255 | . |
| CALIBRATION DATA | |
| ORIGINAL LEVELS $G_{original}$ (RELATIVE DENSITY C) | INPUT LEVELS $G_{in}$ (PIXEL VALUE i) |
| 0 | . |
| ⌇ | ⋮ |
| 255 | . |
| CALIBRATION DATA | |
| ORIGINAL LEVELS $B_{original}$ (RELATIVE DENSITY C) | INPUT LEVELS $B_{in}$ (PIXEL VALUE i) |
| 0 | . |
| ⌇ | ⋮ |
| 255 | . |

FIG.19

| PATCH NO. | P1 | P2 | P3 | P4 | P5 | P6 |
|---|---|---|---|---|---|---|
| PATCH COORDINATER FOR COLORIMETER (I) (x, y) | x1, y1 | x2, y2 | x3, y3 | x4, y4 | x5, y5 | x6, y6 |
| RELATIVE DENSITY C : R, G, B | C0:R | C64:R | C128:R | C192:R | C255:R | C0:G |
| PIXEL VALUE i : R, G, B | i(C0):R | i(C64):R | i(C128):R | i(C192):R | i(C255):R | i(C0):G |

146

| P7 | P8 | P9 | P10 | P11 | P12 | P13 | P14 | P15 |
|---|---|---|---|---|---|---|---|---|
| x7, y7 | x8, y8 | x9, y9 | x10, y10 | x11, y11 | x12, y12 | x13, y13 | x14, y14 | x15, y15 |
| C64:G | C128:G | C192:G | C255:G | C0:B | C64:B | C128:B | C192:B | C255:B |
| i(C64):G | i(C128):G | i(C192):G | i(C255):G | i(C0):B | i(C64):B | i(C128):B | i(C192):B | i(C255):B |

CALIBRATION DATA PREPARING SYSTEM

BACKGROUND OF THE INVENTION

1. Field of the Invention

The present invention relates to a tone characteristic data preparing system for preparing tone characteristic data such as calibration data.

2. Description of Related Art

In conventional printing systems that are capable of performing relatively high-quality multi-level tone printing, color calibration is performed to allow density levels obtained on a printed matter produced by a printer to properly match input density levels that are included in image data originally supplied from an upper mark or superior program, such as an application program.

SUMMARY OF THE INVENTION

It is conceivable to prepare tone characteristic data or calibration data using a procedure described below.

It is now assumed that a printer is designed to be capable of performing color printing using four colors of ink, that is, cyan (C), magenta (M), yellow (Y), and black (K) ink, and to be capable of printing images in multi-level tones, 256 total tone levels, for example, for each color. During the calibration data preparing operation, the printer is controlled to produce a test chart by printing a plurality of color patches as shown in FIG. 1.

As shown in FIG. 1, each color patch is a pattern in an optional shape (square shape in this example) whose inner area is completely printed to a uniform tone. The color patches are printed in four rows, one row for each of the colors of cyan (C), magenta (M), yellow (Y), and black (K). In this example, each row includes nine color patches aligned in the row. The nine patches in each row are printed with nine different output tone levels that are separated by about 32 levels each, that is, 0, 32, 64, 96, 128, 160, 192, 224, and 255 respectively. These values of output levels are applied to the printer to print the patches.

Next, the tone level of each printed patch is measured by a colorimeter, for example. A correspondence relationship between input tone levels, supplied to the printer, and the output tone levels, obtained by the colorimeter, is obtained. Other output tone levels that correspond to input levels that are not actually supplied to the printer, are calculated by interpolating between the actually-measured output tone levels. Then, calibration data is determined that represents a correspondence relationship between all the 0–235 original tone levels, which can be supplied from an upper rank program for producing output tone levels of 0–255, and input tone levels, that should be supplied to the printer to reproduce the corresponding tones.

Afterward, in order to control the printer to actually print desired images, original tone levels supplied from the upper rank program are converted into input tone levels using the calibration data. The converted input tone levels are then supplied to this printer so that the printer can perform printing operation to produce a printed matter.

With this configuration, if output tone levels are measured from the printed matter, the tone levels will properly match the original tone levels, in the image data originally supplied from the upper rank program.

In the above-described conceivable color calibration operations, however, the tone levels of all the patches on the test chart have to be measured. It is noted that the total number of patches is equal to the product of the total number of ink colors and the total number of patches in each color. Because there are four rows of patches with nine patches in each row in the test chart of FIG. 1, then the tone levels of 36 patches have to be measured. This requires a considerable amount of time. It is therefore desirable to reduce the amount of time required for measuring tone levels of the patches.

Additionally, because color calibration operations take a considerable amount of time to complete, a user will possibly desire to start printing in the middle of color calibration preparing operations. However, until the tone levels of all the printed patches are measured, calibration data can not be prepared, so the user can not start printing.

In view of the above-described drawbacks, it is an objective of the present invention to overcome the above-described problems and to provide an improved tone characteristic data producing device that is capable of preparing tone characteristic data in a short period of time and that in capable of preparing tone characteristic data even if operations for measuring tone levels of patches on the test chart are stopped short part of the way through.

In order to attain the above and other objects, the present invention provides a tone characteristic data producing device for producing tone characteristic data of an image formation device, the tone characteristic data producing device, comprising an input unit that inputs data of a plurality of input levels to an image formation device, thereby controlling the image formation device to produce a plurality of tone patches; a measurement control unit that controls a tone measurement device to measure tone of at least two tone patches among the plurality of tone patches, thereby producing data of at least two output levels indicative of the measured tone of the at least two tone patches; a characteristic data production unit that produces tone characteristic data based on relationship between the at least two output levels and corresponding input levels; and a patch number control unit that controls the number of tone patches to be measured by the tone measurement device.

The input unit may preferably input a predetermined number of input levels, for each of a plurality of colors, to the image formation device, thereby controlling the image formation device to form the predetermined number of tone patches for each color, and may further input a single lowest input level for all the colors to the image formation device, thereby controlling the image formation device to form a single tone patch common to all the colors. The patch number control unit may control the measurement control unit to cause the measurement device to measure, for each color, the predetermined number of tone patches that correspond to the predetermined number of tone patches, thereby producing the predetermined number of output levels, and to measure the single one tone patch that commonly corresponds to the lowest input levels for all the colors, thereby producing a single common output level. In this case, the characteristic data production unit produces, for each color, tone characteristic data based on the predetermined number of input levels and the predetermined number of corresponding output levels and based on the lowest input levels and the single common output level.

Thus, is this case, the image formation devise, can form images using several coloring material. The coloring material is for providing color tone. Representative examples of the coloring material are ink, toner, and the like. Because an output level corresponding to the lowest input level can be measured by only a single measurement operation. Thus, the number of patches required to be measured is decreased, and thus, the total amounts of time required for the entire measurement operation can be reduced.

The tone characteristic data producing device may further include a memory storing a standard tone characteristic data. In this case, the measurement control unit includes a judgment unit that judges, for each tone patch, whether a shift, defined between the measured output level and a corresponding standard output level that is obtained based on the standard tone characteristic data, is within a predetermined range.

For example, the characteristic data production unit may store, in the memory, the tone characteristic data produced in each characteristic data producing operation. In this case, the measurement control unit retrieves, for a present characteristic data producing operation, a set of tone characteristic data that has been produced by the tone characteristic data production unit is the latest characteristics data producing operation as the standard tone characteristic data. Or, the standard tone characteristic data may be stored in the memory before the tone characteristic data producing device is shipped from a manufacturer.

The measurement control unit may further include a warning unit that issues a warning when the shift is judged to be out of the predetermined range. Or, the tone characteristic data production unit map include: an output level selecting unit that selects, when the shift obtained for one tone patch is judged to be out of the predetermined range, output levels that are obtained by two tone patches, whose corresponding input levels have values sandwiching an input level for the subject tone patch; and a calculating unit that calculates an output level for the subject tone patch by interpolating between the selected two output levels.

Thus, the system judges, for each tone patch, whether a shift, defined between the measured output level and a corresponding predicted output level that is obtained based on the standard tone characteristic data, is greater than a predetermined reference value. The standard tone characteristic data set has, for as input level of each tone patch, a value of an output level that will generally be outputted from the measurement device when the measurement device measures a tone patch obtained by the corresponding input level. Representative examples of the standard tone characteristic data include: a set of tone characteristic data that in produced in a latest characteristic data production operation, and a set of tone characteristic data prepared before the system is shipped from a manufacturer. That is, the standard tone characteristic data may be another set of tone characteristic data that is produced in a characteristic data production operation performed before the system is shipped from the manufacturer.

A reference value indicative of the predetermined range may be defined in terms of a difference or a ratio between the actually-obtained output level and the predicted output level. When the difference or ratio is not within the predetermined range (±5 or ±5%, for example), it is judged that the shift is greater than the predetermined reference value. When the shift is judged to be greater than the reference value, the system may issue a warning. Or, the system may simply calculate an output level for the subject tone patch by interpolating between two output levels actually obtained by the measurement device for two tone patches, whose corresponding input levels have values that sandwich an input level for the subject tone patch.

The input unit may input a predetermined number of input levels to the image formation device, the predetermined number of input levels including a predetermined lowest input level and a predetermined highest input level, thereby causing the image formation device to form the predetermined number of tone patches. In this case, the patch number control unit controls the measurement control unit to cause corresponding to the predetermined lowest and highest input levels among the predetermined number of tone patches to produce output levels corresponding to at least the lowest and highest input levels, while allowing the measurement control unit to stop control of the measurement device to measure the tone patches after the measurement device measures the tone patches corresponding to the predetermined lowest and highest input levels. The characteristic data production unit produces the tone characteristic data by using the measured output levels and corresponding input levels and by interpolating between the measured output levels to calculate output levels for unmeasured patch.

For example, the input unit my input a predetermined "n" number of different input density levels to the image formation device, thereby controlling the image formation device to form the predetermined "n" number of tone patches corresponding to the "n" number of input density levels, wherein "n" is an integer greater than or equal to three (3). The measurement control unit may control the tone measurement device to successively measure the "n" number of tone patches from a first measurement operation to a n-th measurement operation in an order that either one of the tone patches for the highest and lowest input levels be measured in a "m"-th measurement operation among the total "n" tone patches, where m is an integer greater than or equal to two (2) and smaller than n, and that the other one of the tone patches be measured in a measuring operation conducted prior to the m-th measuring operation. The patch number control unit controls the measurement control unit to cause the measurement device to perform the first to m-th measurement operation, while allowing the measurement control unit to stop control of the measurement after the measurement device performs the m-th measurement operation.

When the m-th measuring operation is completed, measurement of tone patches that are formed based on the highest and lowest input levels are completed. All of the patches not yet measured are formed based on input levels that are greater than the lowest input level and smaller than the highest input level. Though output levels for the not-yet-measured patches can be measured, values near to the output levels for those patches can be calculated by simply interpolating output levels for m-number of patches obtained during the first through m-th measuring operations. It therefore becomes unnecessary to measure the not-yet-measured tone patches. Accordingly, tone characteristic data can be produced based on relationship between the measured output levels and the input levels for the measured tone patches and based on relationship between the calculated values and the input levels for the unmeasured tone patches.

It becomes optional to or not to continue performing the (m+1)-th through n-th measuring operations. It is possible to immediately complete tone characteristic data after completing the first through m-th measuring operations.

The value m be selected as long as the value m is greater than or equal to two (2) and smaller than n. It is possible to immediately stop the measurement as the value "m" decreases. When the number "n" is relatively large, however, it will possibly be difficult to produce accurate tone characteristic data by interpolating the output levels corresponding to the highest and lowest input levels only. In such a case, "m" should be set to some great value. It becomes possible to prevent production of too inaccurate tone characteristic data due to excessively immediately stop of measurement.

For example, the input unit may successively input the n number of input levels in a predetermined order through first through n-th input operations so that the image formation device forms the n tone patches including first through n-th tone patches in the same order and so that the tone measurement device measures at least two tone patches among the a tone patches in the same order, the input unit inputting either one of the highest and lowest input levels in the first input operation and inputting the other one of the highest and lowest input levels in the second input operation, thereby allowing the image formation device to produce each of first and second patches based on either one of the highest and lowest input levels, the input unit inputting input levels for producing $(2^k+2)$-th through $(2^{k+1}+1)$-th tone patches so that each of the input levels has a value between a corresponding adjacent two input levels for the first through $(2^k+1)$-th tone patches when the input levels for the first through $(2^k+1)$-th tone patches are arranged in an order of their magnitudes, where k is an integer greater than or equal to zero (0).

For example, in order to produce ten patches based on ten input levels "0–9," the highest and lowest input levels "9" and "0" are selected as first and second input levels or as second and first input levels to be inputted to the image formation device. That is, the first and second patches map be produced based on input levels "0" and "9" or "9" and "0". Now, it is assumed that the input unit inputs "0" and "9" as first and second input levels in this order. The third patch is produced by inputting, as a third input level, a value of either one of values that are located between the first and second input levels "0" and "0" when the first and second input levels "0" and "9" are arranged in the order of their magnitudes. In this example, therefore, a value of either one of the values "1" through "8" is selected. It is preferable to select a value that is positioned at a substantially centered location when those values of "1" through "8" are arranged in the order of their magnitudes. Accordingly, it is preferable to select "4" or "5". It is now assumed that "4" is selected as the third input level and therefore that the input unit inputs the input level "0" "9" "4" in this order.

In order to produce fourth and fifth patches, the input unit inputs, as fourth and fifth input levels, values that are located between respective two adjacent values among the values of "0," "4" and "9" when they are arranged in the order of their magnitudes. That is, either one of values "1" through "3" that are located between "0" and "4" and either one of values "5" through "8" that are located between "4" and "9" are selected as fourth and fifth input levels, respectively. Also in this case, it is preferable to select a value that is located contend in the values "1" through "3". Therefore, it is preferable to select "2". Similarly, it is preferable to select a value that is located contained in the values "5" through "8". In this case, it is preferable to select "6" or "7". It is now assumed that "2" and "6" are selected as the fourth and fifth input levels. It is noted that either of the selected values "2" and "6" can be set as the fourth input level and the other one be set as the fifth input level. Accordingly, the input unit may input the input levels "0" "9" "4" "2" and "6" in this order, or alternatively may input the input levels "0" "9" "4" 6" and "2" in this order. It is now assumed that the input unit inputs the input levels "0" "9" "4" "2" and "6" in this order.

In the similar manner as described above, in order to produce sixth through ninth patches, the input unit has to input, as sixth through ninth input levels, values that are located between respective two adjacent values among the values of "0," "4," "9," 2," and "6" when they are arranged in the order of their magnitudes, that it, "0, 2, 4, 6, 9". As a result, "1", "3", "5", and "7" are selected as sixth through ninth input levels. "8" may be selected instead of "7" for the ninth input level. It is now assumed that the "7" is selected for the ninth input level. Either one of the thus selected four values may be used as one of the sixth through ninth input levels. For example, the input unit may input "0, 9, 4, 2, 6, 1, 3, 5, 7" in this order. The remaining "8" selected for the last or tenth input level. In total, the input unit inputs "0, 9, 4, 2, 6, 1, 3, 5, 7, and "8" in this order.

Accordingly, any time when the measurement is stopped after measurement of the third patch, input levels for already-measured patches are distributed widely uniformly in the entire range of the input levels. Comparing with the case where input levels for already-measured patches are located collectively within some numerical range, output levels calculated by interpolating between the already-measured output levels can be produced accurately over the entire range for the output levels.

For example, the input unit may input, for each of several colors, the n number of input levels to the image formation device, thereby allowing the image formation device to produce the n number of tone patches for each color, the measurement control unit controlling the tone measurement device to measure, for each color, at least first through m-th tone patches, the characteristic data producing unit producing tone characteristic data, for each color, based on the measured tone patches of the corresponding color.

Accordingly, even when the relationship between the input levels and the output levels are different for each color, tone characteristic data can be produced for each color.

Alternatively, the input unit may input, for a single color, the n number or input levels to the image formation device, thereby allowing the image formation device to produce the n number of tone patches for the single color, the measurement control unit controlling the tone measurement device to measure, for the single color, at least first through m-th tone patches, the characteristic data producing unit producing tone characteristic data, for the single color, based on the measured tone patches. Thus, the system can provide tone characteristic data for a single color component.

The patch number control unit may include a designation unit that designates a desired number of patches to produce. In this case, the input unit inputs the designated number of input levels to the image formation device, thereby producing the designated number of tone patches. The measurement control unit controls the measurement device to measure the designated number of tone patches, thereby producing the designated number of output levels. The characteristic data production unit produces the tone characteristic data based on the designated number of input levels and the corresponding designated number of output levels.

The device may further include a memory storing a plurality of sets of test data, each test data set including the plurality of input levels to be inputted to the image formation device; and a selecting unit that selects one set of test data, produces the designated number of input levels based on the selected test data set, and inputs the produced input levels to the image formation device, thereby allowing the image formation device to produce the plurality of tone patches. In this case, the plurality of note of test data may correspond to a plurality of different tone measurement devices or to a plurality of different, image forming conditions used at the image formation device.

In this case, the device stores a plurality of sets of test data that will control the image formation device to form a plurality of test chart. When one set of test data is selected, the system produces image formation data for printing the test chart based on the selected test data set, and outputs the produced image formation data to the image formation device. Thus, the plurality of sets of test data are stored in a selectable manner. Accordingly, when a desired set of test data is selected from the plurality of sets of test data, the image formation device is controlled to form a test chart based on the selected test data set. For example, the user can select one set of test data that corresponds to a colorimeter that he/she uses and to an actual image formation condition set in the image formation device. The image formation device is controlled to form a test chart based on the selected test data. The user can measure the test chart using his/her own colorimeter. Additionally, tone characteristic data corresponding to the user's desired image formation condition can be properly set. Thus, the tone characteristic data can be highly efficiently set.

Especially when the device stores the plurality of sets of test data in correspondence with a plurality of colorimeters, the user can select one test data set that corresponds to his/her own colorimeter. Thus, a test chart optimum to be measured by the user's colorimeter can be formed by the image formation device.

On the other hand, when the device stores the plurality of sets of test data in correspondence with a plurality of image formation conditions that can be switchingly set to the image formation device, the user can select one test data set that corresponds to image formation condition that he/she sets for the image formation device. Then, a test chart corresponding to the user's selected test data is formed by the image formation device. Based on color measurement data obtained on the test chart, it is possible to set tone characteristic data optimum to the user's desired image formation condition. Accordingly, the tone characteristic producing device is convenient to use. Tone characteristic data obtained by the tone characteristic producing device is optimum for the image formation device to form images.

Each set of test data is comprised from a plurality of types of data that indicates a shape of a test chart, per se., a shape of each of a plurality of patches to be formed on the test chart, how the patches should be arranged, colors of the patches, and etc.

Because the user can designate the number of patches desired to be provided on the test chart, even when using a manual colorimeter, the measurement can be completed within a short period of time. Additionally, by designating the number of patches, it becomes possible to automatically determine tones to be provided on the respective patches using the selected test data set. It may be possible, for example, to uniformly divide the 256 tones of levels for each color by the designated number of patches to determine tones to be provided vat each color patch. Accordingly, it is possible to uniformly distribute the entire 256 tone of each color into the color patches on the test chart. By using the test chart provided with the color patches, it is possible to produce calibration data substantially accurately. It is therefore possible to stably form tonal images that faithfully reproduce image data.

It is noted that the tone characteristic setting device may preferably be incorporated, into a computer system, together with an image processing portion for converting original tone data into input tone data to be supplied to the image formation device. The computer system is comprised from a personal computer, a monitor, a key board, a mouse, and etc. In this case, the monitor is used to display an indication to urge the user to select a desired colorimeter, and the keyboard or the mouser is used to select and input the user's selection. It is possible to successively perform all the processes including: selection of parameters, calculations, output of test image data, input of color measured results, end calculation of tone characteristic data.

The tone characteristic device can be incorporated into an image formation device such as a printer or a display. In this case, the selection unit such as a monitor, a selecting button, and the like has to be incorporated into the image formation device. When the tone characteristic device is incorporated into the image formation device, a test chart can in produced immediately.

The tone characteristic data producing system can be constructed as a system for exclusively producing tone characteristic data. However, the system can be constructed from a general use computer system. In this case, a data recording odium storing a tone characteristic data production program is provided, and the program in retrieved from the data recording medium and installed into the computer system.

That is, the present invention provides a data recording medium, storing a tone characteristic data producing program for being read by a computer system to control the computer system to produce tone characteristic data of an image formation device, the program comprising: a program of inputting data of a plurality of input levels to an image formation device, thereby controlling the image formation device to produce a plurality of tone patches; a program of controlling a tone measurement device to measure tone of at least two tone patches among the plurality of tone patches, thereby producing data of at least two output levels indicative of the measured tone of the at least two tone patches; a program of producing tone characteristic data based on relationship between the at least two output levels and corresponding input levels; and a program of controlling the number of tone patches to be measured.

Representative examples of the data recording medium are: a magnetic data recording medium, such as a flexible disk, from which data can be read magnetically; and an optically data recording medium, such as a CD-ROM from which data can be read optically, and the like. Any data recording medium that can be used in a computer system can be used.

BRIEF DESCRIPTION OF THE DRAWINGS

The above and other objects, features and advantages of the invention will become more apparent from reading the following description of the preferred embodiment taken in connection with the accompanying drawings in which:

FIG. 3(b) is a schematic view showing a data structure of calibration data in the calibration file of FIG. 3(a);

FIG. 3(c) is a schematic view showing a data structure of measurement data that is stored in correspondence with one calibration file of FIG. 3(a);

FIG. 6(b) is a graph indicative of a relationship between input tone levels Din and output tone levels Dout for each color;

FIG. 10 is a table indicating the order of the input tone levels for printing patches;

FIG. 11 is a flowchart representing a tone level measurement process in the calibration file preparation routine of FIG. 9;

FIG. 12 is a flowchart representing a calibration data preparation process in the calibration file preparation routine of FIG. 9;

FIG. 13 is a block diagram showing essential components of a personal computer according to a third embodiment of the present invention;

FIG. 15 is a schematic view representing a colorimeter list for forming different test charts T1 to T3 shown in FIGS. 14(a)–14(c);

FIG. 16 is a schematic view representing basic characteristic data used for determining color tones of patches in a test chart;

FIG. 17(b) is a schematic view showing a data structure of standard calibration data corresponding to the lookup table of FIG. 17(a);

FIG. 19 is a schematic view showing test data determined for printing a test chart with the user's designated number of patches.

DETAILED DESCRIPTION OF THE PREFERRED EMBODIMENTS

Figure 1:
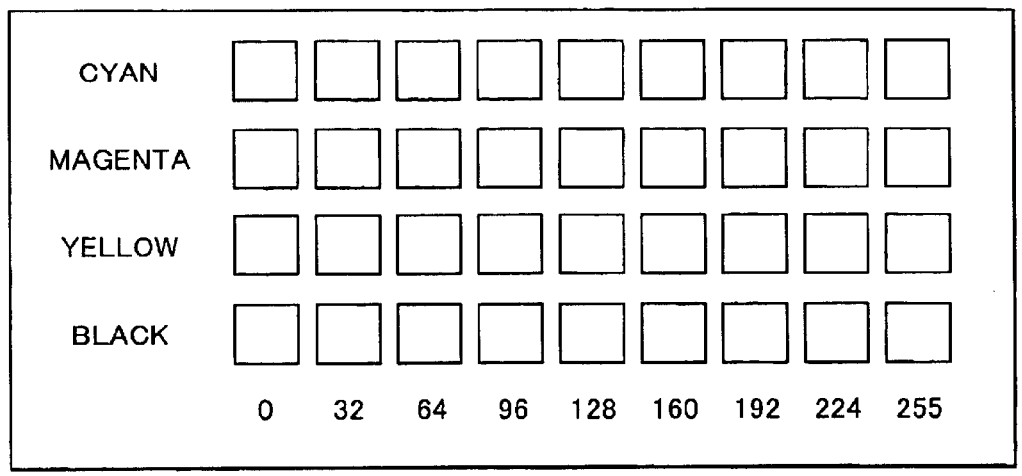
FIG. 1 is a schematic view showing how color patches are arranged in a conceivable test image.

A tone characteristic data producing device according to preferred embodiments of the present invention will be described while referring to the accompanying drawings wherein like parts and components are designated by the same reference numerals to avoid duplicating description.

First, a tone characteristic data producing system according to a first embodiment will be described below.

The first embodiment is provided to decrease the number of patches that have to be measured.

A print system that includes a tone characteristic data preparation system according to the present embodiment will be described below with reference to FIGS. 2 through 8.

Figure 2:
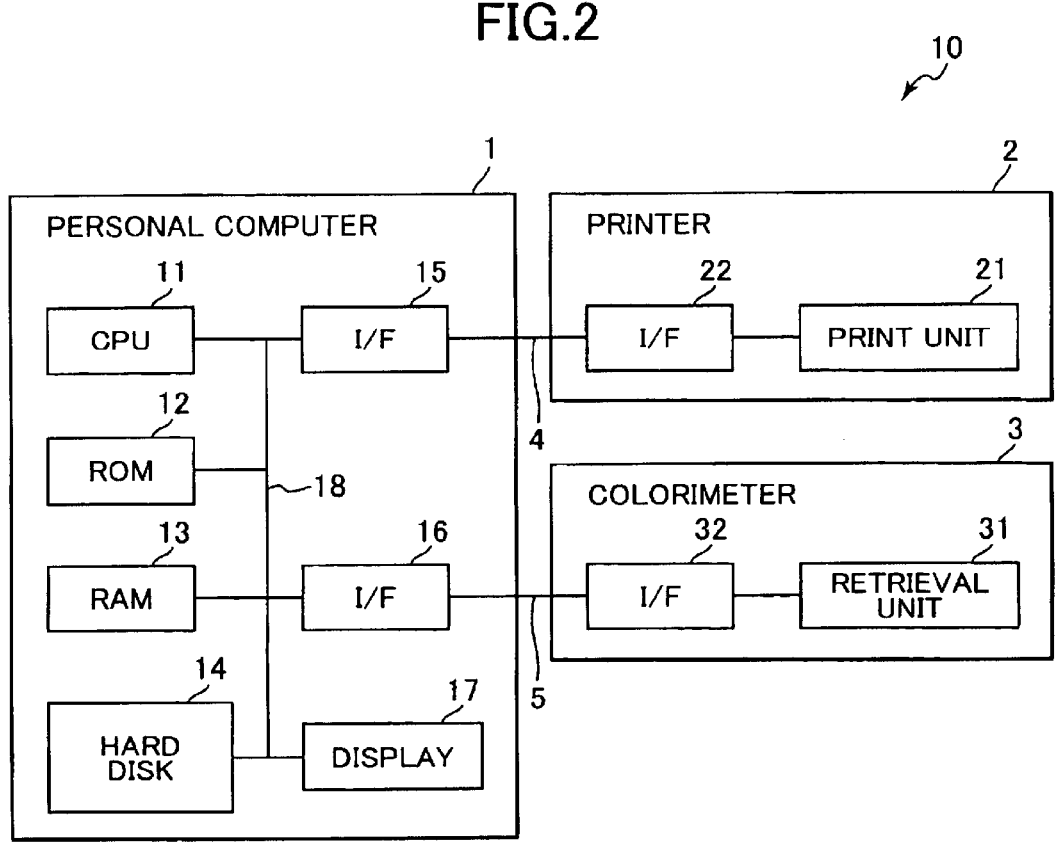
FIG. 2 is a block diagram showing a printing system according to a first embodiment of the present invention.

FIG. 2 shows the printing system 10 that includes a personal computer 1, a printer 2, and a colorimeter 3. The personal computer 1 and the printer 2 are connected by an interface cable 4 for enabling transmission of data between the personal computer 1 and the printer 2. Also, the personal computer 1 and the colorimeter 3 are connected by an interface cable 5 for enabling transmission of data between the personal computer 1 and the colorimeter 3.

The personal computer 1 includes: a CPU 11, a ROM 12, a RAM 13, a hard disk device 14, a printer interface 15, a colorimeter interface 16, and a display 17. All these components are connected together via a bus 18, and therefore are capable of exchanging data via the bus 18.

The CPU 11 is for controlling various components and performing various calculations according to a variety of programs that are stored in the ROM 12 and according to another variety of programs which are retrieved from the, hard disk device 14 and stored in the RAM 13 temporarily. The ROM 12 is read only memory and stores a variety of programs, such as various application programs, and data that does not need to be re-written. The RAM 13 is a random access memory that can be re-written as desired. In addition to the variety of programs retrieved from the hard disk device 14, the RAM 13 stores data obtained by the variety of calculations performed by the CPU 11. The hard disk device 14 is an auxiliary memory that stores, as files, data and progress that are not constantly stored in the main memories such as the ROM 12 and the RAM 13.

In the present embodiment, the ROM 12 stores therein a variety of programs, such as an image formation program (FIG. 7) and a calibration data preparing program (FIG. 4) that are to be executed by the CPU 11. When executing the image formation program of FIG. 7, the CPU 11 receives original tone level data (original pixel data) $D_{original}$ (where D=C, M, Y, K) from an upper rank program such as some application program. The CPU 11 then converts the original tone level data $D_{original}$ (where D=C, M, Y, K) into input tone level data (print pixel data) Din (where D=C, M, Y, K). The CPU 11 performs this conversion in accordance with commands inputted from an external source and based on calibration data (FIG. 3(b)) which is stored in a calibration data file 50 in the HDD 14. The CPU 11 supplies the input level data Din (where D=C, M, Y, K) to the printer 2, whereupon the printer 2 prints images on a desired recording sheet.

The CPU 11 executes the calibration data preparing program (FIG. 4) to produce a calibration file 50 to be stored in the HDD 16. In the calibration data preparing process (FIG. 4), the CPU 11 first controls the printer 2 to print a test chart. The CPU 11 then controls the colorimeter 3 to measure colors of the printed test chart. Based on color measurement data received from the colorimeter 3, the CPU 11 calculates a calibration file 50.

The printer interface 15 performs data transmission in both directions between the printer 2 and the personal computer 1 according to a special transmission protocol agreed upon by the personal computer 1 and the printer 2. Similarly, the colorimeter interface 16 transmits data both ways between the personal computer 1 and the colorimeter 3 according to another special transmission protocol agreed upon the personal computer 1 and the colorimeter 3. The display 17 displays a variety of data in a manner that can be visually recognized by the user of the present system.

The printer 2 includes an ink jet printing unit 21 and a personal computer interface unit 22. This ink jet printing unit 21 executes color printing based on print data Din (where D=C, M, Y, K), inputted from the personal computer 1, using four different colors of ink, that is, cyan, magenta, yellow, and black. The ink jet printing unit 21 can execute multilevel tone printing having 256 tone levels for each color. The PC interface 22 transmits data between the printer 2 and the printer interface 15.

The colorimeter 3 includes a retrieval unit 31 and a PC interface 32. The retrieval unit 31 measures intensity of light transmitted through or reflected from an object being measured. The retrieval unit 31 divides the colors of the subject of measurement into four primary colors (cyan(M), magenta (M), yellow (Y), and black (K)), and outputs the tone of each primary color as color measurement data $D_{out}$ (where D=C, M, Y, K). In the following explanation, the act of actually measuring tone in the subject of investigation and obtaining color measurement data will be referred to as measuring tone level or measuring color. The PC interface 32 is for transmitting data between the colorimeter 3 and the colorimeter interface 16.

Figure 3A:
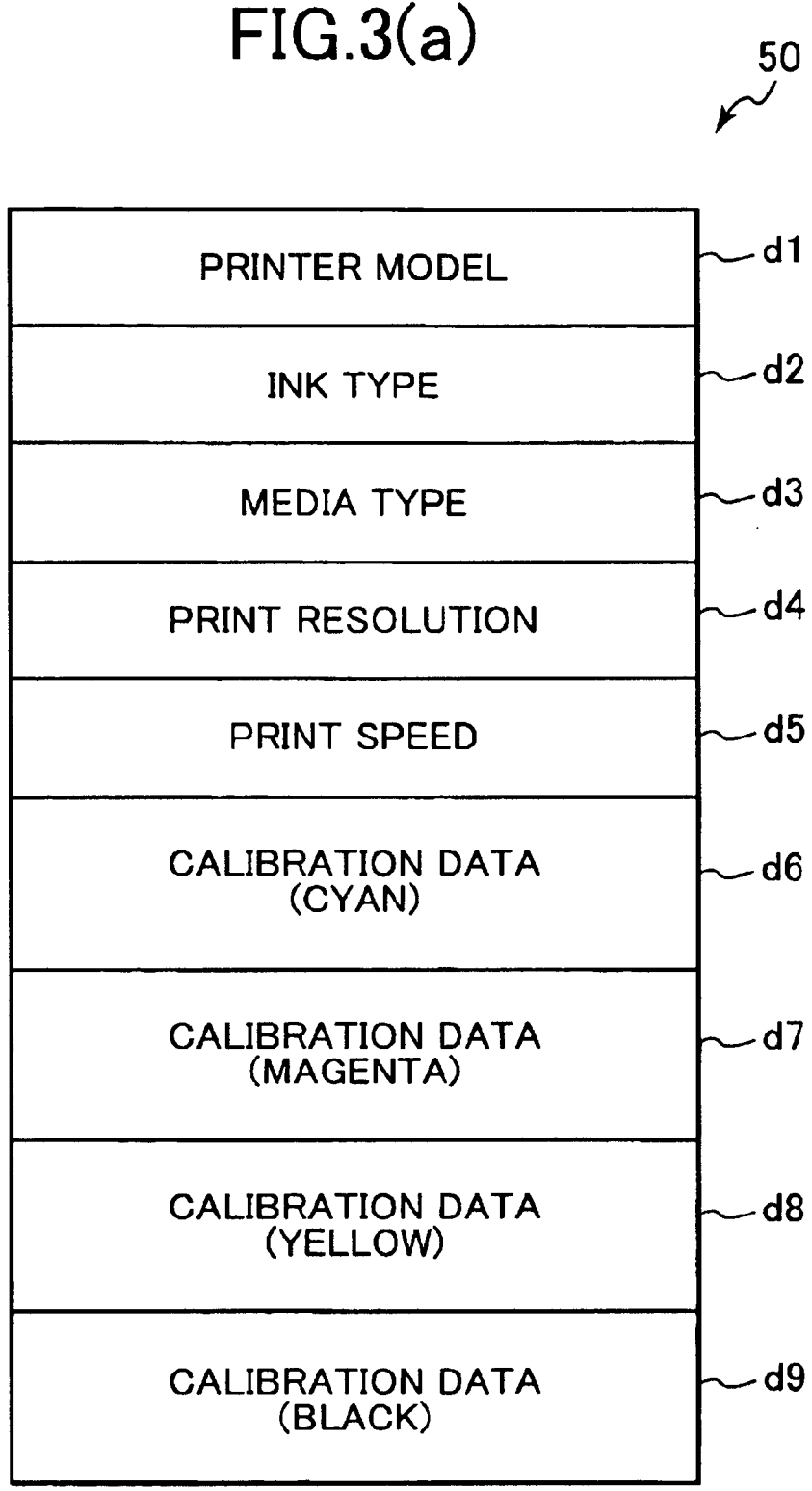
FIG. 3(a) is a schematic view showing a data structure in a calibration file.

It is noted that a calibration data file 50 is prepared in the hard disk device 14 when the calibration file preparation routine (FIG. 4) is executed. As shown in FIG. 3(a), a variety of information, such as printer model region d1, ink type region d2, media type region d3, print resolution region d4, print speed region d5, and four sets of calibration data regions d6 to d9 are stored in the calibration data file.

The printer model region d1 stores a code that is different for each different recording method, such as ink jet printing and laser printing. The ink type region d2 stores a code representing a type of coloring agent, such as pigment ink, dye ink, or toner. The media type region d3 stores a code representing a type of media used for printing, such as normal paper, a glossy paper, or resin film. The print resolution region d4 stores numerical data representing the number of dots to be printed per inch. The print speed region d5 stores a code representing printing speed, such as normal speed printing or high speed printing.

The calibration date regions d6 to d9 correspond to the respective colors (cyan, magenta, yellow, and black). Each calibration data region d6–d9 stores one set of calibration data for a corresponding color. Each set of calibration data includes 256 sets of numerical data. The total 256 sets of numerical data respectively indicate input levels Din (where D=C, M, Y, K) which should be inputted to the printer 2 in order to allow the printer 2 to actually print tones that match original tone levels $D_{original}$ (where D=C, M, Y, K) of 0–255 that can be received from an upper rank program.

In each set of calibration data, as shown in FIG. 3(b), the 256 numerical values Din (where D=C, M, Y, K) are located at positions from a 0-th location to a 255-th location in association with corresponding original tone levels $D_{original}$ (where D=C, M, Y, K) of 0 to 255. The calibration data indicates that each tone level $D_{original}$ will be reproduced when a corresponding value Din is supplied to the printer 2.

Figure 7:
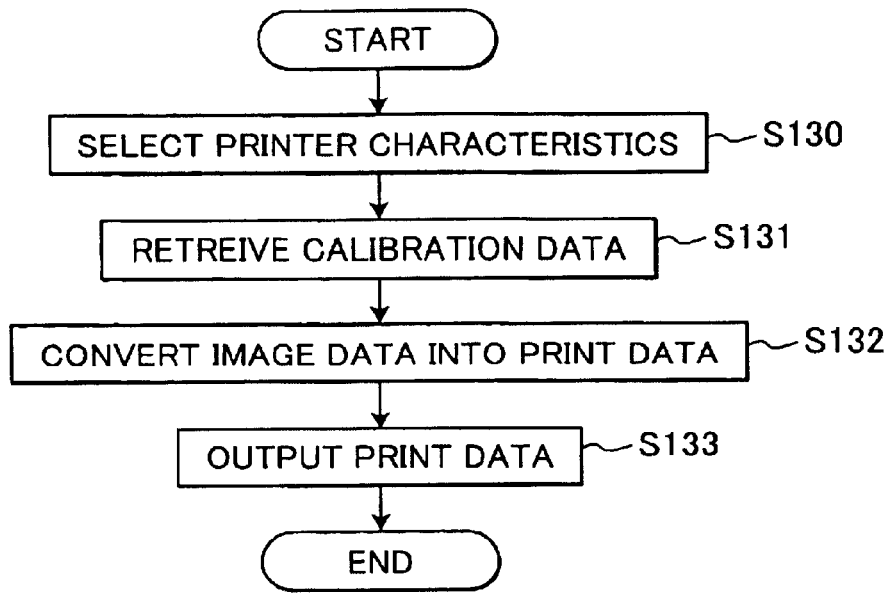
FIG. 7 is a flowchart representing a printing routine.

During the image formation process of FIG. 7, when the CPU 11 receives, from some upper rank program, an original tone level $C_{original}$ of "200," for example, the CPU 11 retrieves one numerical data Cin from the 200-th location in the calibration data region d6, and supplies the retrieved data Cin to the printer 2. As a result, the printer 2 will print a tone that actually has a tone level substantially the same as the original tone level $C_{original}$ of "200" if it is measured.

It is further noted that the HDD 16 further stores a set of measurement data 60 in correspondence with each calibration data file 50, that is, in correspondence with each print characteristic. Each set of measurement data 60 is prepared simultaneously when the corresponding set of calibration data is prepared.

In each set of measurement data 60, as shown in FIG. 3(c), 256 numerical values Dout (where D=C, M, Y, K) are located at positions from a 0-th location to 255-th location in association with corresponding input tone levels Din (where D=C, M, Y, K) of 0 to 255. The measurement data 60 indicates that when each value Din is supplied to the printer 2, a corresponding tone level Dout is reproduced on a printed matter.

Figure 4:
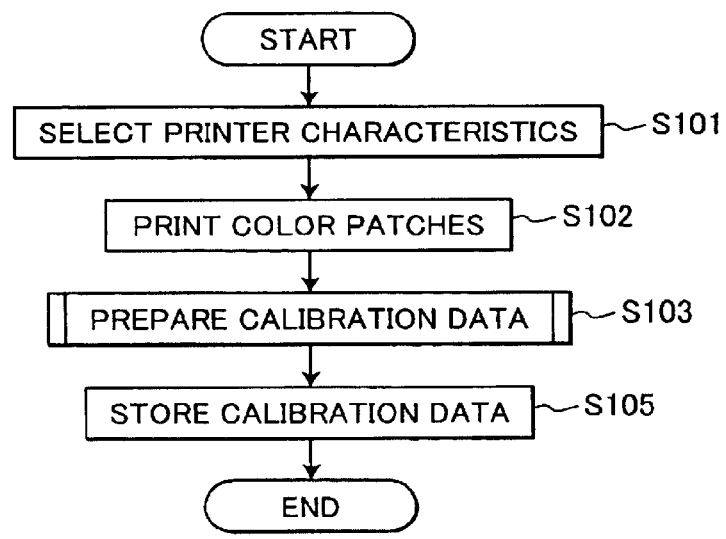
FIG. 4 is a flowchart representing a calibration file preparation routine.

With the above-described structure, the printer system 10 prepares the calibration data 50 by executing the calibration file preparation process shown in FIG. 4.

The calibration file preparation process is performed when the CPU 11 executes the calibration file preparation program stored in the ROM 12.

When the calibration file preparation process is started, first in S101, the CPU 11 performs operations to enable the user to select printer characteristics. At this time, the CPU 11 controls the display 17 to display categories relating to printer characteristics. In the present embodiment, the display 17 displays five categories, in total, of printer type, ink type, media type, print resolution, and print speed. Each category includes a plurality of preset selections so that the user can select a single optional selection from the plurality of selections.

Next, in S102, the printer 2 is controlled to produce a test chart by printing a plurality of color patches which are needed for measuring tone levels. More specifically, the CPU 11 first prepares input level data or print data Din (where D=C, M, Y, K) for the test image and transfers the input level data to the printer 2. In this example, the CPU 11 prepares input level data for printing eight color patches with cyan tone levels Cin of 32, 64, 96, 128, 160, 192, 224, 255, eight color patches with magenta tone levels Min of 32, 64, 96, 128, 160, 192, 224, 255, eight color patches with yellow tone levels Yin of 32, 64, 96, 128, 160, 192, 224, 255, eight color patches with black tone levels Kin of 32, 64, 96, 128, 160, 192, 224, 255, and one color patch with all the tone levels Cin, Min, Yin, and Kin of 0.

Figure 5:
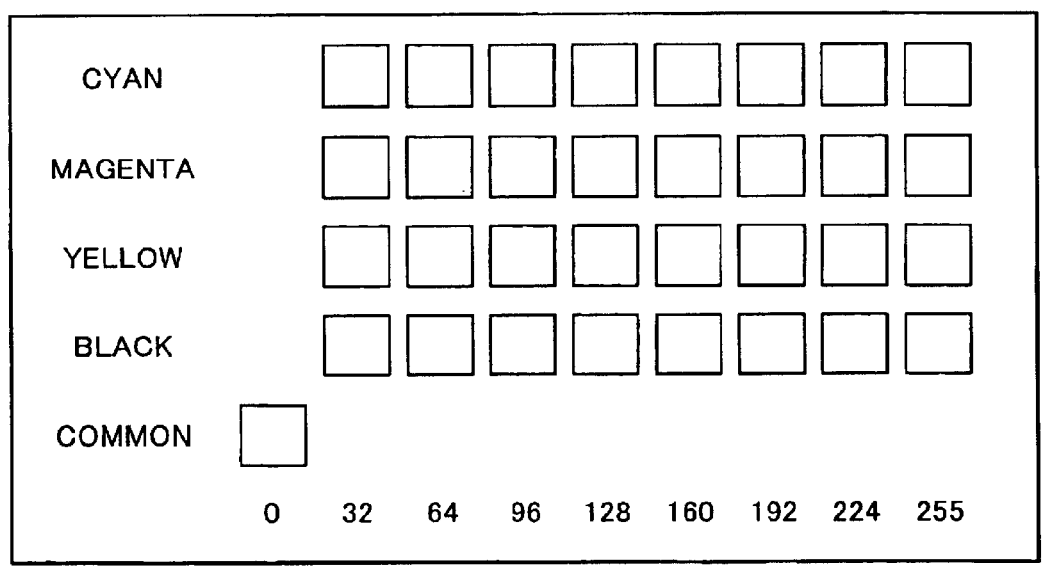
FIG. 5 shows how color patches are arranged in a test chart.

Receiving the print data, the printer 2 produces a test chart by printing a plurality of color patches as shown in FIG. 5. In the test image, four rows of patches are printed, one row corresponding to each different color ink, cyan, magenta, yellow, and black. Each row includes eight patches with different tones Din (where D=C, M, Y, K) of corresponding color, that is 32, 64, 96, 128, 160, 192, 224, 255. Thus, in each row, adjacent patches are separated by about 32 levels of tone. In addition to these 32 patches (4 rows×8 patches per row), a 33rd patch is included in the test chart. The 33rd patch is printed by the printer 2 with the tone level Din (where D=C, M, Y, K) of zero (0) for all the colors. In other words, the 33rd patch is a colorless patch whose entire area will be measured as colorless by the colorimeter 3. It is noted that each patch is a square pattern having a sufficient surface area to enable the colorimeter 3 to measure the tone level of each patch.

Next, the CPU 11 prepares calibration data 50 in S103.

Figure 6A:
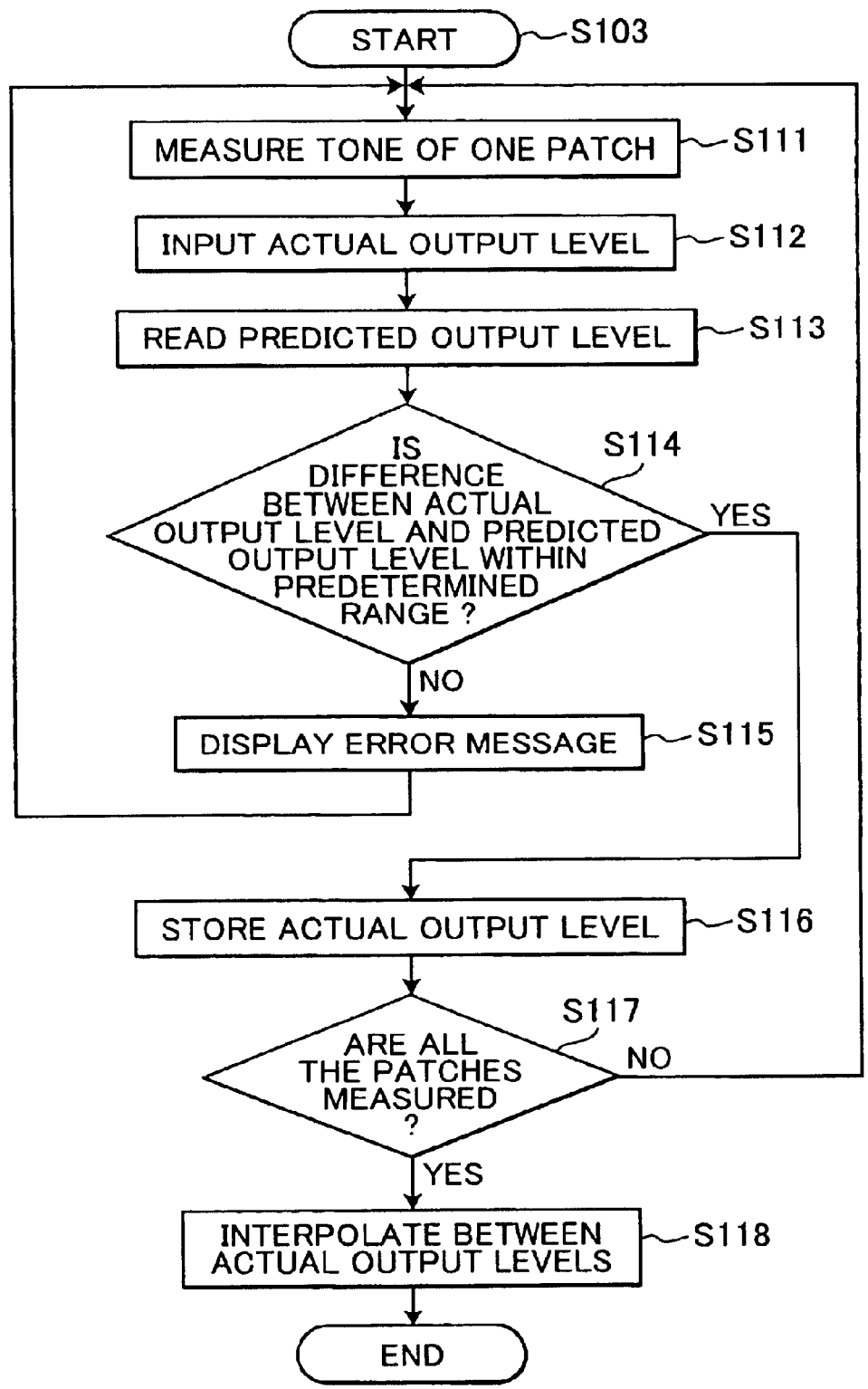
FIG. 6(a) is a flowchart representing a calibration data production process in the calibration file preparation routine of FIG. 3.

The processes in S103 will be described, below in detail with reference to the flowchart of FIG. 6(a).

In processes of S103, after the tone level of one patch is measured using the colorimeter 3 in S111, the measured tone level (which will be referred to as an "actual output level" hereinafter) Dout (where D=C, M, Y, K) is inputted into the personal computer 1 in S112. It is noted that by repeating the processes of S111 and S112, the 33 patches are measured successively in a predetermined order, and the resultant actual output levels Dout are also inputted into the personal computer 1 successively in the same order.

Next, in S113, another output level (referred to as a "predicted output level" hereinafter) Dout' (where D=C, M, Y, or K) that corresponds to the input level Din (where D=C, M, Y, or K) for the presently-measured patch is retrieved from a measurement data file 60 (FIG. 3(c)) that has been prepared, during a previously-performed calibration operation of FIG. 4, for the same printing characteristic selected in S101. In the process of S113, therefore, the CPU 11 retrieves an output level Don (where D=C, M, Y, or K) that is stored in the measurement file 60 in correspondence with the input tone level Din (where D=C, M, Y, or K) for the presently-measured pitch. The CPU 11 determines the retrieved output level Don as the predicted output level Dout' (where D=C, M, Y, or K).

In S114, the CPU 11 determines whether the difference between the actual output level Dout and the predicted output level Dout' is within a predetermined range of, for example, ±5. If not (S114:NO), then in S115, the CPU 11 displays an error message on the display 17. Then, the routine returns to S111. Thus, when there occurs an error in the measurement of the tone level, then the error is displayed immediately, so that the user can again perform the tone measurement.

On the other hand, in S114, if the difference between the actual output level Dout and the predicted output level Dout' is within the predetermined range (S114:YES), then in S116, the actual output level Dout is stored as effective data in the RAM 14.

In S117, it is determined whether actual measurement of tone levels has been completed for all the 33 patches. If not (S117:NO), then the routine returns to S111 so that the processes of S111 to S117 are repeated until tone levels have been measured for all 33 patches.

On the other hand, when tone level has been measured for all 33 patches (S117:YES), then the process proceeds to S118. In S118, the CPU 11 performs, for each color, interpolation between the actual output levels Dout to determine all the tone levels that should be obtained by the printer 3 in response to all the 256 input levels Din (where D=C, M, Y, K) of "0" to "255". More specifically, because actual output levels Dout are obtained in S111–S117 only for input levels Din of 0, 32, 64, 96, 128, 160, 192, 224, and 225, output levels Dout for other input levels 1–31, 33–63, 65–95, 97–127, 129–159, 161–191, 193–223, and 225–254 are estimated by interpolating between the obtained actual output levels Dout. Once output levels Dout have been completely obtained in correspondence with all the input levels Din (where D=C, M, Y, K) of 0–255 for each color, the CPU 11 completely produces a now measurement data file 60, as shown in FIG. 3(c). The thus produced new measurement data file 60 indicates a relationship between each input level Din, applied to the printer 2, and a corresponding output tone level Dout, reproduced by the printer 2. As shown in the graph of FIG. 6(b). The CPU 11 rewrites the new measurement data file 60, appended with data indicative of the presently-selected printing conditions, onto the measurement data file 60 that has been already stored in the HDD 16 and that has been used in S113.

Based on the thus produced measurement data file 60, the CPU 11 further calculates, for each color, which input level Din (where D=C, M, Y, K) should be applied to the printer 2 in order to reproduce each of the 256 output tone levels Dout of 0–255. As a result 256 input level Din (where D=C, M, Y, K) are determined, for each color, as a value that is capable of controlling the printer 2 to reproduce the respective tone levels Dout of 0–255.

Then, under the assumption that a tone level Dout obtained by the printer 2 has a linear relationship with an original tone level $D_{original}$ (where D=C, M, Y, K) to be supplied from an upper rank program, the CPU 11 arranges the 256 numerical values Din that should be applied to the printer 2 to reproduce the tones Dout of 0–256, in correspondence with 256 original numerical values $D_{original}$ of 0–255 as shown in FIG. 3(b).

Thus, four sets of calibration data are prepared respectively for the four colors (cyan, magenta, yellow, and black). Each set of calibration data is thus prepared based on the actual output levels of nine patches: that is, eight patches that correspond to each different color and also the 33rd colorless patch. Because the input tone level Din for each color (cyan, magenta, yellow, and black) is zero (0) for the same 33rd patch, the obtained actual output level Dout for the same 33rd patch can be used commonly for preparing all the four sets of calibration data.

It should be noted that the method of determining data by interpolating between the nine actual output levels Dout are optional. For example, linear interpolation can be used to determine an output value Dout between two adjacent points using actual output levels Dout at the two adjacent points. Or, interpolation may be performed using a curve of the second order. In this case, an approximate expression that appears the most appropriate can be determined using the least square method by using additional points other than the adjacent points.

Once the calibration data has been completely prepared, then the program proceeds from S103 to S105 (FIG. 4).

In S105, the four sets of calibration data prepared by the processes in S103 and the print characteristic selected in S101 are stored together in as a single calibration file 50 as shown in FIG. 3(a).

When printing is performed thereafter, the image formation program shown in FIG. 7 is retrieved from the ROM 12, and is executed by the CPU 11.

During the printing process, the user first designates, in S130, a print characteristic in terms of the printer model, ink type, media type, print resolution, and print speed. In response to the input of the user's designation, the CPU 11 retrieves, in S131, one set of calibration data from a calibration file 50 that is set with the user's designated print conditions. Then, in S132, the CPU 11 receives original tone level data $D_{original}$ (D=C, M, Y, K) included in image data, supplied from a desired upper rank program, and converts the original level data $D_{original}$ (D=C, M, Y, K) into input level data Din (D=C, M, Y, K) using the retrieved calibration data. Then, in S133, the CPU 11 outputs the input level data Din (D=C, M, Y, K) to the printer 2, thereby allowing the printer 2 to print the tone level designated by the original level data Din (D=C, M, Y, K). That is, if tone levels are measured from a print output actually obtained by the printer 2, the measured tone levels Dout (where D=C, M, Y, K) will properly match the original tone levels Din (D=C, M, Y, K).

As described above, when the printing system 10 of the present embodiment prepares four sets of calibration data corresponding to the four colors of cyan, magenta, yellow, and black, output tone levels for the lowest input level or zero (0) for all the four colors are measured from a single patch that is common to all the colors. Therefore, the tone levels of fewer patches needs to be measured than the conceivable configuration of FIG. 1 wherein the output tone levels for the lowest input level values are measured from four different patches, one for each color. Because the tone levels of fewer patches need to be measured, operations for measuring tone levels can be performed as much less time.

Also, the printing system 10 of the present embodiment checks whether difference between each actual output level Dout and a corresponding predicted output level Dout' is within the predetermined range in S114. If not within the predetermined range, then the error message is displayed on the display 17 and the routine returns to S111. Accordingly, when the warning appears, the tone level can be again measured. If necessary, the user can stop measurement of tone levels. With this configuration, time will not be wasted by continuing measuring tone levels after erroneously measuring a patch or improperly operating the measurement equipment of colorimeter.

In the above description, the HDD 14 updates a measurement data file 60 every time when the calibration data preparation operation of FIG. 4 is performed. The measurement data file 60 will be used for supplying predicted output levels Dout' during the next calibration data preparation operation. However, instead of storing the measurement data file 60 every time when the calibration data preparation operation of FIG. 4 is performed, the HDD 16 may store, for each printing characteristic, a single fixed measurement data file 60 that has been produced during a calibration data preparation process before the printing system 10 is shipped from a manufacturer. The single fixed measurement data file 60 will repeatedly be used to supply the predicted output levels Dout' every time when the calibration data preparation process is executed.

Additionally, in the above description, the HDD 16 stores the measurement data file 60 in order to supply predicted output levels Dout'. However, the HDD 16 may not store the measurement data file 60. The predicted output levels Dout' can be determined in S113 based on calibration data 50 that has been obtained during the previous calibration data preparation operation. Or, the HDD 16 may store, for each printing characteristic, a single fixed, standard calibration data file 50' that has been originally produced during a calibration data preparation process executed before the printing system 10 is shipped from a manufacturer. The single standard calibration data file 50' will repeatedly be used to supply the predicted output levels Dout'.

Figure 8:
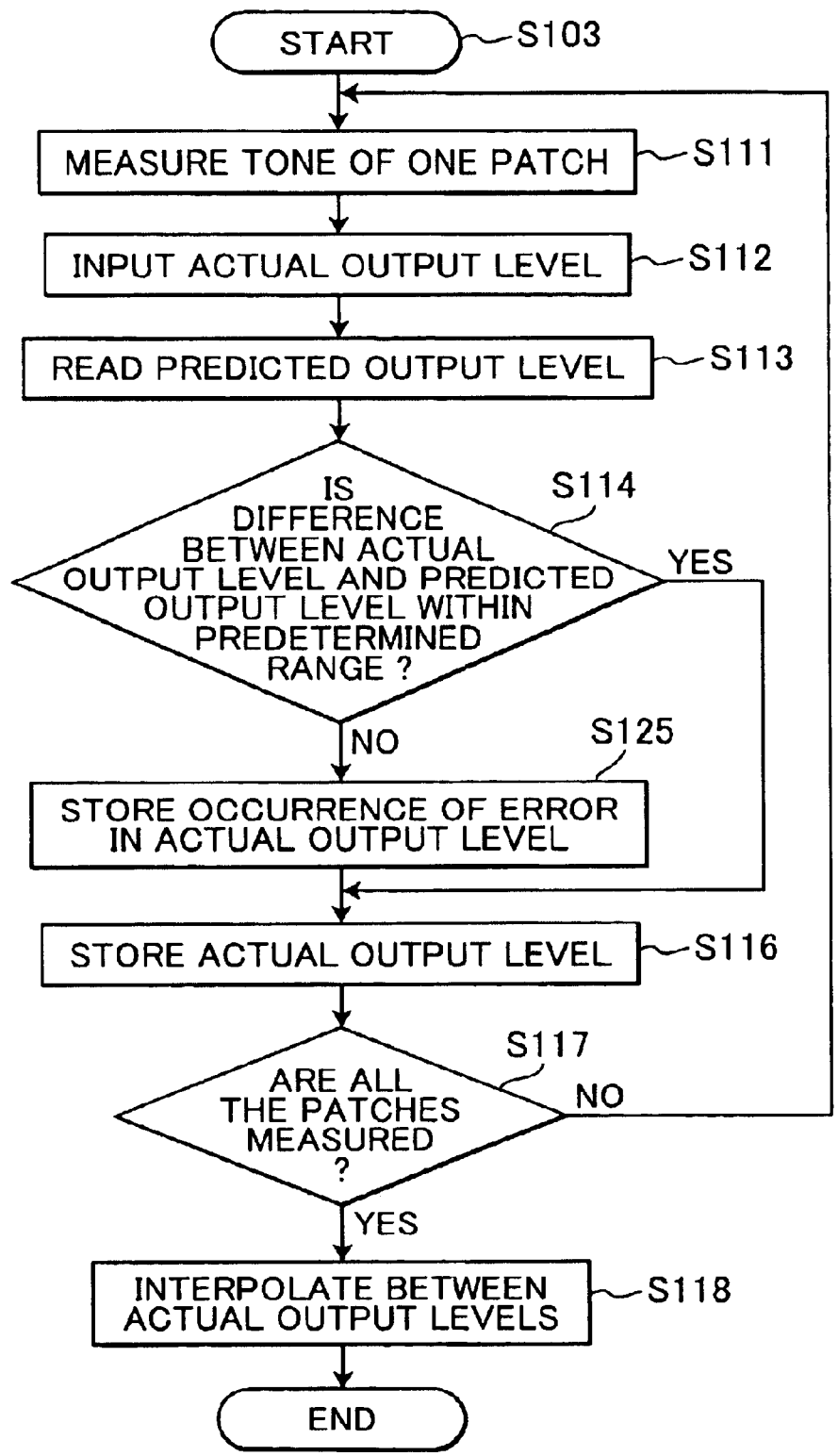
FIG. 8 is a flowchart representing a modified calibration data production process in the calibration file preparation routine of FIG. 3.

The printing system 10 of the present embodiment can execute a modified calibration data processing routine of FIG. 8 instead of executing the calibration data preparation routine of FIG. 6(*a*).

The modified routine of FIG. 8 is the same as that of FIG. 6(*a*) except for the processes of S125 and S128.

In the routine of FIG. 6(*a*), when the difference between the actual output level Dout and the predicted output level Dout' is not within the predetermined range (no in S114), then the error message is displayed in S115, and color of the subject patch is measured again in S111–S114. Contrarily, according to the measuring routine of FIG. 8, when the difference between the actual output level Dout and the predicted output level Dout' is not within the predetermined range (no in S114), the CPU 11 stores, in S125, data including that an error occurs in the actual output level Dout for the subject patch. It is noted that the data indicative of the occurrence of error can be stored using an optional method. For example, the error-occurring actual output level Dout can be substituted by an impossible value, such as a negative value. Or, the error-occurring actual output level Dout can be set with a flag showing that an error occurs.

According to the modified routine of FIG. 6, a process of S128 is executed instead of the process of S118. In the process of S128, error-occurring actual input levels Dout are first removed from the RAM 114. Then, the CPU 11 interpolates between remaining, non-error-occurring actual output levels Dout, to estimate correct output levels Dout for the error-occurring actual output levels Dout. The CPU 11 further calculates other output levels Dout corresponding to the input levels Din of 1–31, 33–63, 65–95, 97–127, 129–159, 161–191, and 193–223 by interpolating between the non-error-occurring actual output levels Dout.

Thus, according to the modified routine of FIG. 8, if an error occurs in the measurement of one patch (no in S114), a correct output level Dout for the subject patch is estimated by interpolating between actual output levels Dout obtained from other non-error-occurring patches that are located sandwiching the subject patch therebetween and that are produced based on input levels Din that sandwiches the input level Din for the subject patch therebetween. In this way, calibration data is prepared. Accordingly, calibration data that is fairly precise can be prepared without spending a great deal of time to re-measure output levels Dout.

Thus, according to the present embodiment, in order to prepare tone characteristic data or calibration data based on measurements of tone levels of four colors by nine tones, the lowest tone level is measured only once from the single patch that is common to all the four colors. As a result, the entire operation time can be reduced by the time that is required to measure three more patches. If there is a considerable gap between the actually-measured output level and the predicted output level (S114:NO), then an error message is displayed (S115). Then, the measurements are performed once again. Therefore, wasteful operations will not be continued with the tone characteristic data in its mistaken form. Instead displaying the error message, the error-occurring output value can be replaced with a value that is determined by interpolating between non error occurring output values around the error-occurring output value.

In the above description, the difference between the actual output level Dout and the predicted output level Dout' is compared in S114 with a predetermined value indicative of the predetermined range. However, a ratio between the actual output level Dout and the predicted output level Dout' may be compared in S114 with a predetermined value indicative of the predetermined range, ±5% for example.

A tone characteristic data producing system according to a second embodiment of the present invention will be described below with reference to FIGS. 9–12.

The second embodiment is provided to allow the user to stop measurement of patches even in the middle of the measurement and to produce tone characteristic data or calibration data based on the already-measured patches only.

A print system 10 that includes the tone characteristic data preparing system of the present embodiment can be constructed in the same structure as shown in FIG. 2 to prepare a measurement data file 60 the same as shown in FIG. 3(*c*), thereby preparing a calibration data file 50 the same as shown in FIGS. 3(*a*) and 3(*b*).

Figure 9:
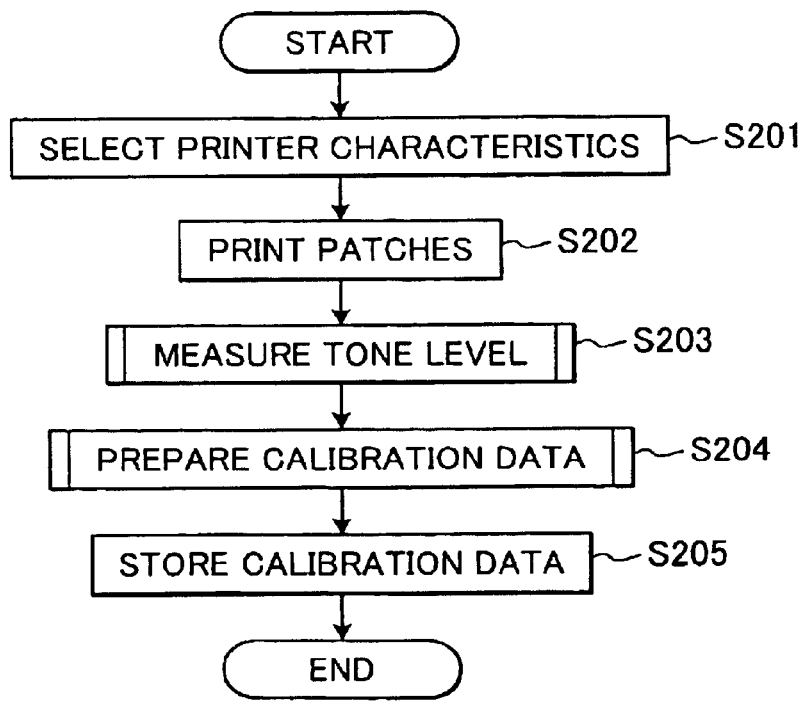
FIG. 9 is a flowchart representing a calibration file preparation routine according to a second embodiment.

According to the present embodiment, the print system 10 of FIG. 2 executes a calibration file preparation process shown in FIG. 9, instead of executing the calibration file preparation process shown in FIG. 4. That is, a calibration file preparation program shown in FIG. 9 is stored in the ROM 12.

The calibration file preparation process is performed when the CPU 11 executes the corresponding calibration file preparation program stored in the ROM 12.

When the calibration file preparation process is started, the CPU 11 performs operations in S201 to enable the user to select printer characteristic in the same manner as in S101 in FIG. 4. Then, the process proceeds to S202. In S202, the printer 2 produces a test chart by printing a plurality of color patches as needed for measuring tone levels. More specifically, the CPU 11 prepares print data Din (where D=C, M, Y, K) for the test chart and transfers the print data to the printer 2.

According to the present embodiment, the CPU 11 prepares 256 sets of input level data Din (where D=C, M, Y, K) indicative of tones of 0 to 255 for each of the four colors: cyan, magenta, yellow, and black. The thus prepared input level data or print data Din (where D=C, M, Y, K) will control the printer 2 to print 1,024 (=4×256) patches, in total. Upon receiving the 256 sets of print data Din (where D=C, M, Y, K) for each of the four colors (cyan, magenta, yellow, and black) from the CPU 11, the printer 2 prints 256 patches with each color.

The present embodiment is characterized in the order in which the 256 patches are arranged for each color on the test chart. It is noted that the 256 patches for each color are arranged in the same order that the colorimeter 3 will measure the 256 patches. For each color, the 256 patches are printed with the input tone levels Din (where D=C, M, Y, K) of 0–255 and are arranged in the order shown in FIG. 10 for each color.

The order of the input tone levels Din on the test chart is determined in a manner described below.

First, the lowest input level Din of "0" is set for printing the first patch. The lowest input level Din of "0" is therefore located in correspondence with the order number "0" in FIG. 10. The highest input level Din of "255" is set for printing the second patch. The highest input level Din of "255" is therefore located in correspondence with the order number "1" in FIG. 10.

Then, a value is designated for a coefficient "k", which is for determining which input levels Din "2" to "255" are used for which of the third to last patches. The coefficient k is an integer that is greater than or equal to 0.

The coefficient k is first set to a value of "0". Next, already-determined input levels Din for the first to $(2^k+1)$th patches are aligned in the order of the input level magnitude. In this example, since k is now equal to "o", the input level set for the first and second patches respectively, are aligned in the magnitude order of 0, 255. Then, the input levels for the $(2^k+2)$th to $(2^{k+1}+1)$th patches are set to values between adjacent ones of the already-determined first to $(2^k+1)$th patches that are now aligned in the order of their input level magnitudes. For example, when k equals zero, then both the $(2^k+2)$th and the $(2^{k+1}+1)$th patches will be the third patch, so the input level of the third patch is set to a value between 0 and 255, that is, set to one input level from the input levels 1 to 254. It is preferable that input levels for the $(2^k30\ 2)$th and the $(2^{k+1}+1)$th patches be set to values that are substantially centered between adjacent ones of the aligned input levels for the first to $(2^k+1)$th patches. In this example, it is desirable to set the input level for the third patch to 128, because this input level is centered between the aligned input levels 0, 255 of the first and second patches.

Then, the value of the coefficient k is incremented by one and the process repeated to determine input levels for the next set of $(2^k+2)$th to $(2^{k+1}+1)$th patches. In this example, the value of the coefficient k is incremented from zero to one. In this case, the input levels are determined for the fourth and fifth patches, by aligning the input levels for the first to third patches in the magnitude order of 0, 128, 255, and then designating the input level of the fourth patch as one of 1 to 127, or preferably 64, and the input level of the fifth patch as one of 129 to 254, or preferably 192.

When k is again incremented by one to two, then the input levels for the sixth to ninth patches are determined. First, the input levels assigned to the first to fifth patches are aligned in size order of 0, 64, 128, 192, 255. Then the input level for the sixth patch is set to one of 1 to 63, preferably 32, the input level for the seventh patch is set to one of 65 to 127, preferably 96, the input level for the eighth patch is set to one of 129 to 191, preferably 160 and the input level for the ninth patch is set to one of 193 to 254, preferably 224.

By repeating the above-described calculations for all values of k up to and including seven, the input level of all 256 patches can be set.

It should be noted that input levels can be inserted anywhere between already-set adjacent input levels, and need not be inserted exactly centered between adjacent input levels. For example, the input level of the third patch need not be set to 128, but could instead be set to any of the values 1 through 254. That is, in the extreme case, the value of the third patch can be set to 1 or 254. However, to provide a better distribution of tone levels, it is desirable to set new input levels substantially centered between adjacent input levels. For example, it is desirable to set the input level of the third patch to somewhere in the range of 120 to 140, and most desirable to set the input level of third patch to either 127 or 128.

Also, input levels set for the first and second patches can be switched. That is, the input level for the second patch can be set for the input level for the first patch, and the input level for the first patch can be set for the input level for the second patch. Similarly, input levels set for the fourth and fifth patches can be switched. That is, the input levels set for the fifth patch can be set for the input level for the fourth patch, and the input levels set for the fourth patch can be set for the input level for the fifth patch. Also, input levels set for the sixth to ninth patches can be switched. That is, the input level set for each of the sixth to ninth patches can be set for any other patches in the sixth to ninth patches. Thus, input levels set for a single group of patches defined by the same value "k" can be set to any patches within the same patch group. In the example of FIG. 10, input levels obtained for each group of patches defined by the same value of "k" are set to the constituent patches so that the input levels will be arranged in their magnitudes from the smallest to the largest.

When the test chart is completely printed, the program proceeds from S202 to S203 where the tone level Dout for each patch is measured using the colorimeter 3.

The processes of S203 executed for each of the four colors (cyan, magenta, yellow, and black) will be described in more detail with reference to the flowchart in FIG. 11.

In the process of S203, when the tone level Dout of one patch is measured using the colorimeter 3 in S211, the measured tone level (actual output level) Dout is inputted to the personal computer 1 in S212. It is noted that the 256 patches for each color are measured in succession according to the order that the 256 patches have been arranged in S202 in the manner described above. The personal computer 1 successively receives the tons levels Dout for the respective patches as the colorimeter 3 successively measures tone levels of the patches according to the proper order.

The CPU 11 stores the received actual output level Dout for each patch in a file in S213. Then, in S214, the CPU 11 determines whether measurements of the tone level should be continued or not. Here, when the user does not indicate that the measurement should be discontinued, and when the tone level of the 256-th patch has not yet been measured (S214:YES), then it is determined that the tone level measurements are to be continued and the program returns to S211.

On the other hand, when the user has inputted commands to discontinue measurement operations or when the tone level of the 256-th patch has been measured, then it is determined that measurements of the tone levels are completed (S214:NO) and the present routine is ended.

When operation for measuring tone levels are completed, then the routine of S203 in FIG. 9 is completed. Therefore, in S204, calibration data is prepared. The process of S204 executed for each of the four colors (cyan, magenta, yellow, and black) will be described in detail with references to the flowchart in FIG. 12.

First, in S221, one actual output level Dout (where D=C, M, Y, or K) stored in processes of S213 is retrieved from the file, and in C122 an input level Din (where D=C, M, Y, or K) that has been applied to the printer 2 to print the patch for the subject actual output level Dout retrieved in S221 is retrieved from a separate file. Then, in S223, a table is prepared to represent the correspondence between those two sets of level data as shown in FIG. 3(a). More specifically, the input level Din applied to the printer 2 is set as an address offset value, and the corresponding actual output level Dout is stored in memory region of a table indicated by that address.

In S224, the CPU 11 judges whether or not any actual output levels stored in the processes of S213 remain not yet processed, and if some output level remain unprocessed (S224:NO), then the program returns to S221. As a result of this operation, while some actual output levels stored during S213 remain unprocessed, the processes of S221 to S224 are repeated and the actual output levels are stored in proper memory regions in the table.

Once all the actual output levels stored during S213 are stored in the proper memory regions in the table (S224:YES), then in S225 the CPU 11 judges whether or not the thus stored actual output levels correspond to all the input levels of 0 to 255.

If the actual output levels correspond to all the input levels of 0–255 (S225:yes), the program proceeds to S227. On the other hand, if the actual output levels do not correspond to all the input levels of 0–255 (S225:NO), it is determined that the measurement operation in S203 has been stopped in the middle of the measurement. Accordingly, the CPU 11 calculates in S226 output levels for unmeasured patches by interpolating between actual output levels now stored in the table, thereby setting output levels in the table in corresponding to all of the input levels 0 to 255. As a result, the table is completed as the measurement data file 60 (FIG. 3(c) that shows the relationship between all the input levels Din of 0–255 and corresponding output levels Dout in the same manner as shown in FIG. 6(b).

Next, in S227, in the same manner as described in the first embodiment, the CPU 11 prepares a set of calibration data, as shown in FIG. 3(b), that indicates the relationship between all the original tone values $D_{original}$ of 0–255 and input levels Din which should be applied to the printer 2 to reproduce the corresponding tone levels $D_{original}$. Thus, preparation of calibration data is completed.

The above-described processes in S221 to S226 are executed for each of the four colors to prepare four sets of calibration data.

It is noted that for the purposes of clarity and simplicity, the above explanation is provided with the assumption that the colorimeter 3 is designed to produce values in the range of 0 to 255 as the actual output levels Dout. However, it is unnecessary that the colorimeter 3 be designed to produce values in the range of 0 to 255. It is sufficient that the colorimeter 3 be designed to output color measurement data as a value of a reflection rate or a density that conforms some unit system. In this case, the density value or the reflection rate value from the colorimeter 3 is normalised to have values in the range of 0 to 255.

For example, if the colorimeter 3 is designed to produce density tape, the colorimeter 3 can output a value in a range of about 0 to 2.0. In this case, values obtained from the colorimeter 3 are normalized to values in a distribution range that properly corresponds to the tone range of 0 to 255 to be applied to the printer 2. In this case, when color management data D is obtained from the measurement of some patch, a tone level "LEV" for the subject patch, to be applied to the printer 2, can be obtained by calculating a formula shown below using the subject color measurement value D and the maximum color measurement value Vmax and the minimum color measure value Vmin obtainable by the colorimeter 3.

$$LEV=(10^{-D}-10^{-Dmin})/(10^{-Dmax}-10^{-Dmin})\times 255$$

Once the calibration data is prepared in this manner, then the processes represented in S204 in FIG. 9 will be completed so the program proceeds to S205 whereupon the printer characteristic selected during S201 and the four sets of calibration data prepared in S203 are stored together as a single calibration file 50 as shown in FIG. 3(a).

Thus, according to the present embodiment, in order to measure patches on the test image, the patches that have been printed with the highest and lowest input levels are first measured. Only the user's desired number of patches are measured thereafter among the remaining patches that have been printed with input levels that are between the highest and lowest input levels. Measurements can be stopped without measuring all the patches. Tone characteristic data or calibration data is produced for the actually-measured patches based on the correspondence relationship between the measured output levels and the corresponding input levels and for the unmeasured patches by interpolating between the output levels obtained from the actually-measured patches.

Thus, in the print system 10 of the present embodiment, whether or not the tone level of the third and subsequent patches is measured is optional. As long as at least the first and the second patches have been measured, then the tone characteristic data can be prepared and printing can be performed even without measuring tone levels of all other patches printed.

In particular, the third and subsequent patches are arranged in the order that their corresponding input levels fill in uniformly between input levels of patches that are already measured. Therefore, no matter when measurements are stopped, the input levels corresponding to already-measured patches are unlikely to be unevenly centered within some range. Accordingly, when calculating output levels of unmeasured patches by interpolating between output levels of measured patches, the output levels can be obtained highly precisely over the entire range, compared to the situation wherein the input levels corresponding to the measured patches are concentrated within some range.

In the printing system of the present embodiment, the patches printed using the uppermost value applicable to the printer 2 and the lowermost value applicable to the printer 2 are printed as the first and second patches to be measured. However, the patch printed by the uppermost value and the patch printed by the lowermost value can be arranged for third or subsequent measurement. For example, the first, second, and third patches can have the input levels of 0, 218, and 255 respectively.

It is noted that the printing system of the first and second embodiments uses a color printer as the printer 2. However, the printer 2 can be a monochrome printer capable of printing in multilevel tones. In this case, in order to adjust or calibrate a tone level of a single color, calibration data is prepared in the same manner as described above for the corresponding single color and is stored in a single calibration data file. The calibration data can be used during printing the corresponding color.

The printing system of the first and second embodiments prepares a plurality of sets of calibration data only in the number equivalent to the number of different ink colors. However, the same type of calibration data can be prepared for color mixture obtained by combining two or more of these ink colors.

It is noted that in the printing system according to each of the first and second embodiment, both the printer 2 and the colorimeter 3 are connected to the single personal computer 1. However, a separate personal computer can be connected to each of the printer 2 and the colorimeter 3 to make a color patch preparation system which includes the printer and its personal computer and a calibration data preparation system which includes the colorimeter and its personal computer. A printing system can also be prepared to have these two systems as subsidiary systems. In such a system, the color patch preparation system performs printing operation. Therefore, in this case, the calibration data file prepared in the calibration data preparation system has to be accessible by the color patch preparation system. Such access can be realized by connecting the subsidiary systems together by a transmission mechanism such as a local area network (LAN). Or, the calibration data file can be stored in a portable recording medium, such as a floppy disk at the calibration data preparation system side. This calibration data file is read by color patch preparation system so that the color patch preparation system can perform printing operation as needed. In this case, there is no need to provide a configuration to enable data transmission directed between two subsidiary systems.

Also, when a network that is configured from several subsidiary systems connected by a transmission mechanism includes a plurality of personal computers, a plurality of printers, or a plurality of colorimeters, each of the color patch preparation system and the calibration data preparation system can be configured by an optional combination of one of the personal computers, one of the printers, and one of the colorimeters.

In the printing system of the first and second embodiments, the printer 2 is an ink jet printer. However, other printers besides ink jet printer can be used. Any recording method that is capable of performing multi-level tone printing can be used with any other types of printer, the tone characteristic data can be prepared by the calibration file preparation processes of the embodiments, stored in a calibration data file, and used during printing.

It should be noted that in the printing system of the first and second embodiments, the personal computer 1 stores the calibration file preparation program and the printing process program in its ROM 12. However, these types of programs can be stored in the hard disk device 14 and retrieved into the RAM 13 when needed to execute these processes.

A tone characteristic data producing system according to a third embodiment of the present invention will be described below with reference to FIGS. 13 through 20.

The third embodiment is provided to allow the user to designate the number of patches to be printed and to produce calibration data based on the printed patches.

FIG. 13 is a block diagram showing essential components of a personal computer 200 that serves as the tone characteristic data producing system of the present embodiment.

The personal computer 200 includes a computer portion 104 which houses therein a CPU 110, a ROM 112, a RAM 114, and a hard disk drive (HDD) 116. The HDD 116 is connected to the CPU 110, the ROM 112, and the RAM 114 via an interface 120 and a bus 118. A keyboard 130, a mouse 132, a monitor 134, a printer 136, and a colorimeter 138 are connected to the bus 118 of the computer body 184 each by a separate interface 122. The ROM 112 stores a variety of programs such as various application programs.

According to the present embodiment, the printer 136 is of a type that executes color printing based on print data Din (where D=R, G, B), inputted from the personal computer 200. The printer 136 can execute multi-level tone printing having 256 tone levels for each color (R, G, B). The colorimeter 138 is of a type that measures intensity of light transmitted through or reflected from an object being measured. The colorimeter 138 divides the colors of the subject of measurement into three primary colors (red (R), green (G), and blue (B)), and outputs the tone of each primary color as color measurement data.

The HDD 116 stores calibration data 150 for each set of printing conditions as will be described later. The HDD 116 also stores colorimeter list data 140 and basic characteristic data 142 as also will be described later.

The HDD 116 further stores therein a variety of programs, such as an image formation program (FIG. 20) and a calibration data setting program (FIG. 18), to be described later, that are executed by the CPU 110.

Figure 20:
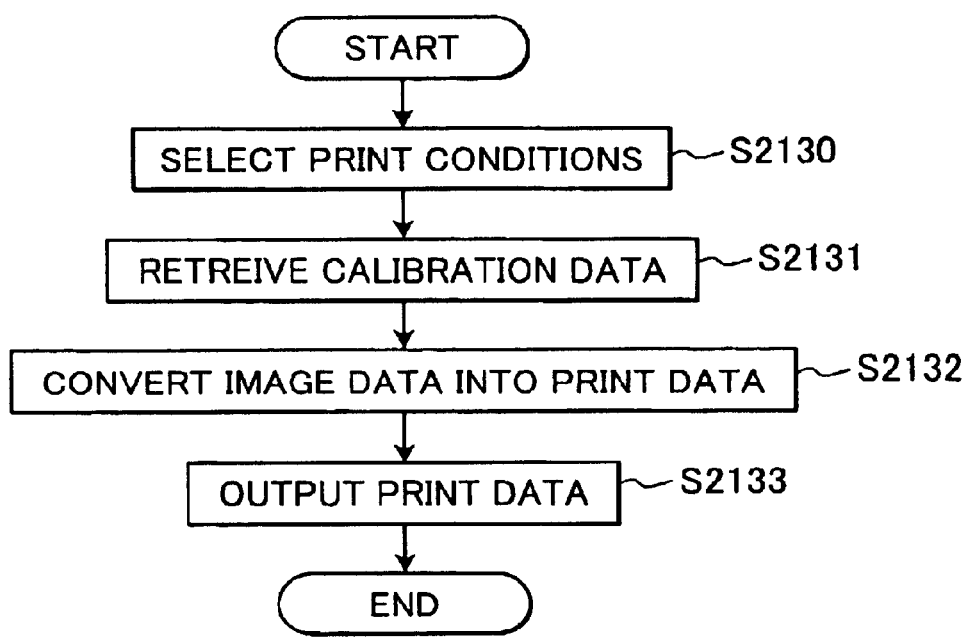
FIG. 20 is a flowchart representing a printing routine according to the third embodiment.

When executing the image formation program of FIG. 20, the CPU 110 receives original tone level data (original pixel data) $D_{original}$ (where D=R, G, B) from an upper rank program such as some application program. The CPU 110 then converts the original tone level data $D_{original}$ (where D=R, G, B) into input tone level data (print pixel data) Din (where D=R, G, B). The CPU 110 performs this conversion in accordance with commands inputted from an external source and based on calibration data (FIG. 17(b)) which is stored in a calibration data file 150 in the HDD 16. The CPU 110 supplies the input level data Din (where D=R, G, B) to the printer 136, whereupon the printer 136 prints images on a desired recording sheet.

The CPU 110 executes the calibration data setting program to update the calibration data 150 stored in the HDD 116. In the calibration data setting process, the CPU 110 first controls the printer 136 to prior a test chart using the colorimeter list data 140 and the basic characteristic data 142. The CPU 110 controls the colorimeter 138 to measure colors of the printed test chart. The CPU 110 then receives color measurement data from the colorimeter 138, and uses the retrieved color measurement data to update the calibration data 150.

The colorimeter list data 140 and the basic characteristic data 143 are used during the calculation data setting process to control the printer 136 to print the test chart. The colorimeter list data 140 and the basic characteristic data 142 are stored in the HDD 116 in a data format described below.

The colorimeter list data 140 and the basic characteristic data 142 are for enabling the CPU 110 to prepare test data (image formation data) that can control the printer 136 to print a test chart in a manner that is optimum both for the type of colorimeter 138 used to measure the test chart and for the print condition set in the printer 136.

More specifically, by executing the calibration data setting program, the CPU 110 can prepare various types of test charts corresponding to various types of colorimeters 38.

Figure 14A:
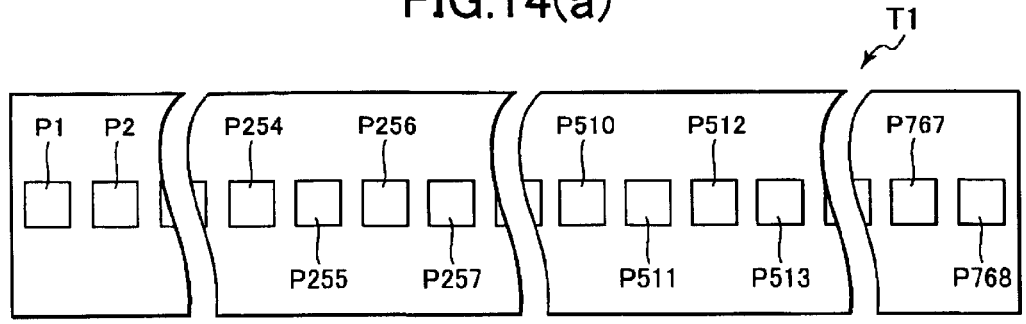
FIGS. 14(a) to 14(c) are schematic views showing test charts corresponding to different colorimeters.
Figure 14B:
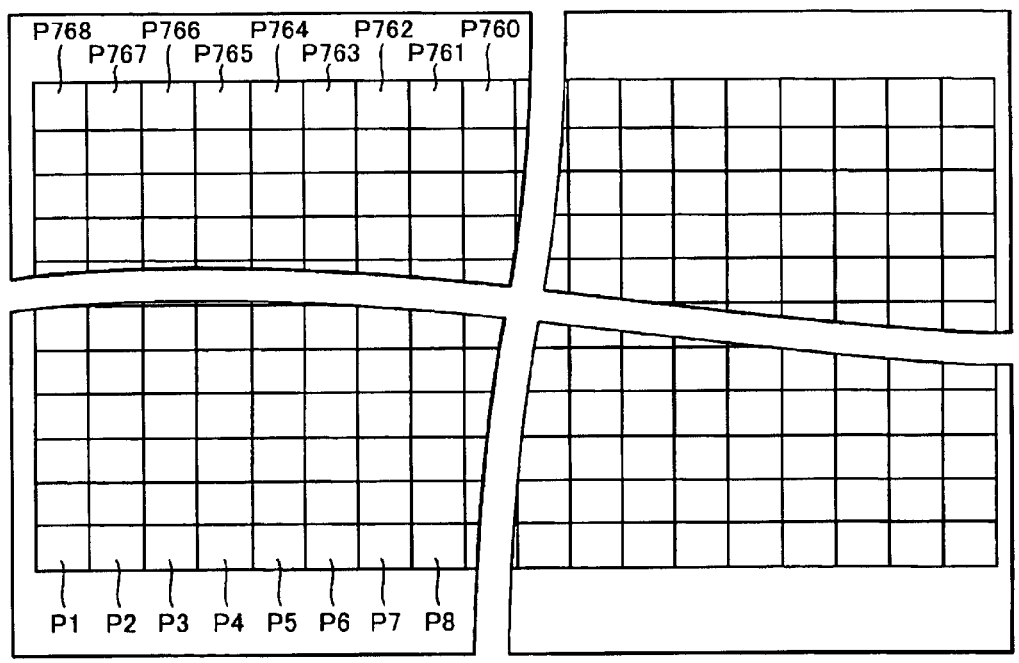
Figure 14C:
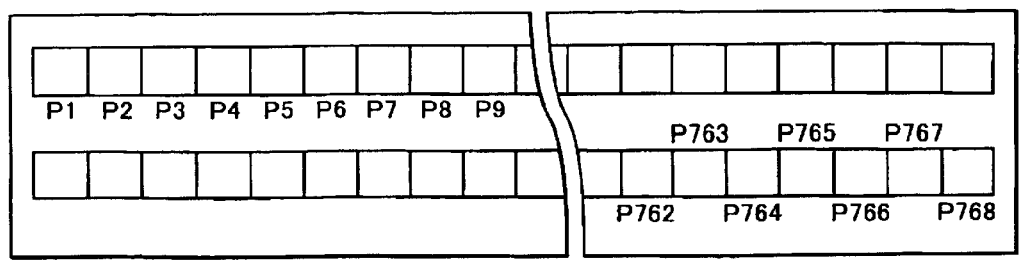

FIGS. 14(a) to 14(c) show representative examples of test charts that the CPU 110 can control the printer 136 to print by executing the calibration data setting program. FIG. 14(a) shows a test chart T1 formed from a one dimensional row of square patches. This test chart T1 is suitable for being measured by a "X-Rite DTP41" (trade name) manufactured by X-Rite, Incorporated, for example. FIG. 14(b) shows another test chart T2 with a two dimensional distribution of square patches. The test chart T2 is suitable for being measured by a "GretagMacbeth SpectroScan" (trade name) manufactured by GretagMacbeth, for example. FIG. 14(c) shows a test chart T3 formed from two dimensional rows of square patches. The test chart T3 is suitable for being measured manually by a "X-Rite 938" (trade name) manufactured by X-Rite, Incorporated or a "GretagMacbeth Spectroline" (trade name) manufactured by GretagMacbeth, for example.

The test chart T1 includes a total of 768 patches that are separated from one another by a predetermined space of, for example, 1 mm. Each patch has a square shape with dimensions of 2 mm width by 2 mm height. In this example, the patches are numbered P1 to P768. The test chart T1 has therefore 256 color tones for each of red (R), green (G), and blue (B). The direction in which the patches are distributed corresponds to the direction in which the test chart T1 will be transported with respect to the colorimeter 138. Accordingly, the patches are measured one at a time in order starting from the patch P1 and ending with the patch P768.

The test chart T2 includes 768 square patches that are distributed in a rectangular pattern. Each square patch has a height of 2 mm and width of 2 mm. The patches are distributed within 24 rows and 32 columns with no spaces between adjacent patches. Therefore, in the same manner s the test chart T1, the test chart T2 has 256 color tones for each of the red (R), green (G), and blue (B) colors. The test chart T2 is suitable for a colorimeter, such as the "Gretag-Macbeth SpectroScan" (trade name), that measures colors in a zigzag pattern across the surface of the test chart T2 starting from the patch P1 following the patches in order to the patch P768.

The test chart T3 includes two parallel rows of square patches. Each square patch has a width of 4 mm and height of 4 mm. The first row includes patch P1 to patch P383. The second row includes patch P343 to patch P768. The test chart T3 is for use with a manual colorimeter, such as the a "X-Rite 938" (trade name) or "GretagMacbeth Spectroline" (trade name), that is configured to measure colors by the user operating a button, for example, while successively changing the patch position coordinates. The test chart T3 is printed with patch numbers, that is, P1 to P768 at positions just above or just below the corresponding patches.

FIG. 15 shows a data structure of the colorimeter list 140. The colorimeter list 140 is for enabling the printer 136 to print any of the test charts T1 to T3 shown in FIGS. 2(a) to 2(c). The colorimeter list 140 is used to control the printer 136 to print a test chart that corresponds to each of the variety of colorimeters. The colorimeter list 140 includes, for each type of colorimeter, data of patch coordinates (x, y) that represent positions of all the patches P1 to P768 that make up a test chart to be used for the corresponding colorimeter. The HDD 116 stores the colorimeter list 140 together with a variety of other data indicating the size of the test chart, the point of the origin of the patch coordinates, and the like (not shown).

FIG. 16 shows a data structure of the basic characteristic data 142. The basic characteristic data 142 is for enabling the printer 136 to print patches with color tones appropriate for a variety of print conditions relating to the printer 136. More specifically, the basic characteristics data 142 includes a plurality of sets of basic test data 144 for printing patches with color tones corresponding to a plurality of different printing conditions, such as the types of paper that can be used in the printer 136, the types of ink that can be used in the printer 136, the resolutions used during printing of images in the printer 136, and the area tone methods used when printing images by the printer 136. Examples of different types of sheets include: normal paper, coated paper, and overhead projected film. Examples of different types of inks: include standard ink and photoink. Examples of different resolution include: 300 dpi and 600 dpi. Examples of different area tone methods include: a Bayer dither method and a spiral dither method.

The basic characteristic data 142 is stored in the HDD 116 to have a plurality of look up tables 144 in correspondence with the plurality of printing conditions. Thus, a separate lookup table 144 is stored for each different set of print condition. The lookup table 144 is prepared to include basic test data for printing a test chart using the printer 136. More specifically, as indicated by a solid line in FIG. 17(a), the lookup table 144 includes numerical values for a dot gain curve for each of three colors of red (R), green (G), and blue (B). Each dot gain curve shows a relationship between: an original level $D_{original}$ (where D=R, G, B) ( which will be referred to as a "relative density value C (=R, G, B)" hereinafter) indicative of a density that should be reproduced on each patch, and an input level Din (where D=R, G, B) (which will be referred to as "pixel value i" hereinafter) that should be applied to the printer 136 in order to reproduce the corresponding relative density value C.

A plurality of calibration data files 150 are further stored in the HDD 116 in correspondence with the plurality of lookup tables 144. That is, each data file 150 corresponds to one of the printing conditions set in the basic characteristic data 142.

Figure 17A:
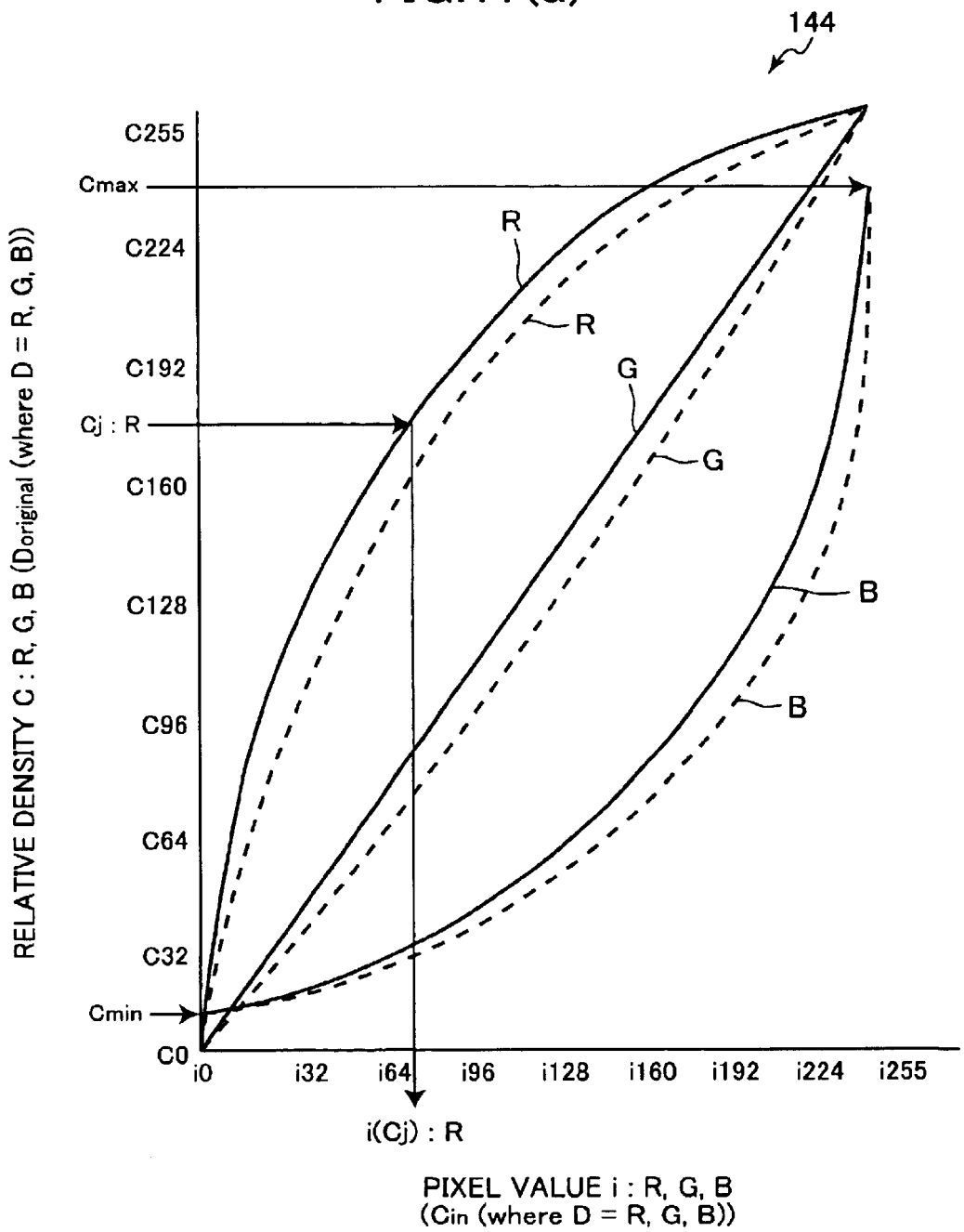
FIG. 17(a) is a graph representing a lookup table for one set of basic characteristics data shown in FIG. 16.

Each calibration data file 150 is prepared to indicate the relationship, shown in the corresponding lookup table 144 (FIG. 17(a)), between the original tone levels $D_{original}$ (where D=R, G, B), that is, relative densities C (=R, G, B), and the input tone levels Din (where D=R, G, B). Each calibration data file 150 therefore has a data structure as shown in FIG. 17(b) similarly to the calibration data (FIG. 3(b)) in the first embodiment. More specifically, each calibration file 150 includes three sets of calibration data for the respective three colors (red, green, and blue). In each set of calibration data, 256 numerical values Din (where D=R, G, B) are located at positions from a 0-th location to a 255-th location in association with corresponding original tone levels $D_{original}$ (where D=R, G, B) of 0 to 255. The calibration data indicates that each tone level $D_{original}$ will be reproduced when a corresponding value Din is supplied to the printer 2.

During the image formation process of FIG. 20, when the CPU 11 receives, from some upper rank program, an original tone level $R_{original}$ of "200," for example, the CPU 11 retrieves one numerical data Rin from the 200-th location in the calibration data, and supplies the retrieved data Rin to the printer 136. As a result, the printer 136 will print a tone that actually has a tone level substantially the same as the original tone level $R_{original}$ of "200" if it is measured.

With the above-described structure, the computer 200 executes the calibration data setting process to control the printer 136 to actually print a test chart using the basic test data 144 stored in the HDD 116 and to update the calibration data 150.

The calibration data setting process is executed by the CPU 110 when the user inputs a command to execute this process from an external source such as a keyboard 130 or a mouse 132.

Figure 18:
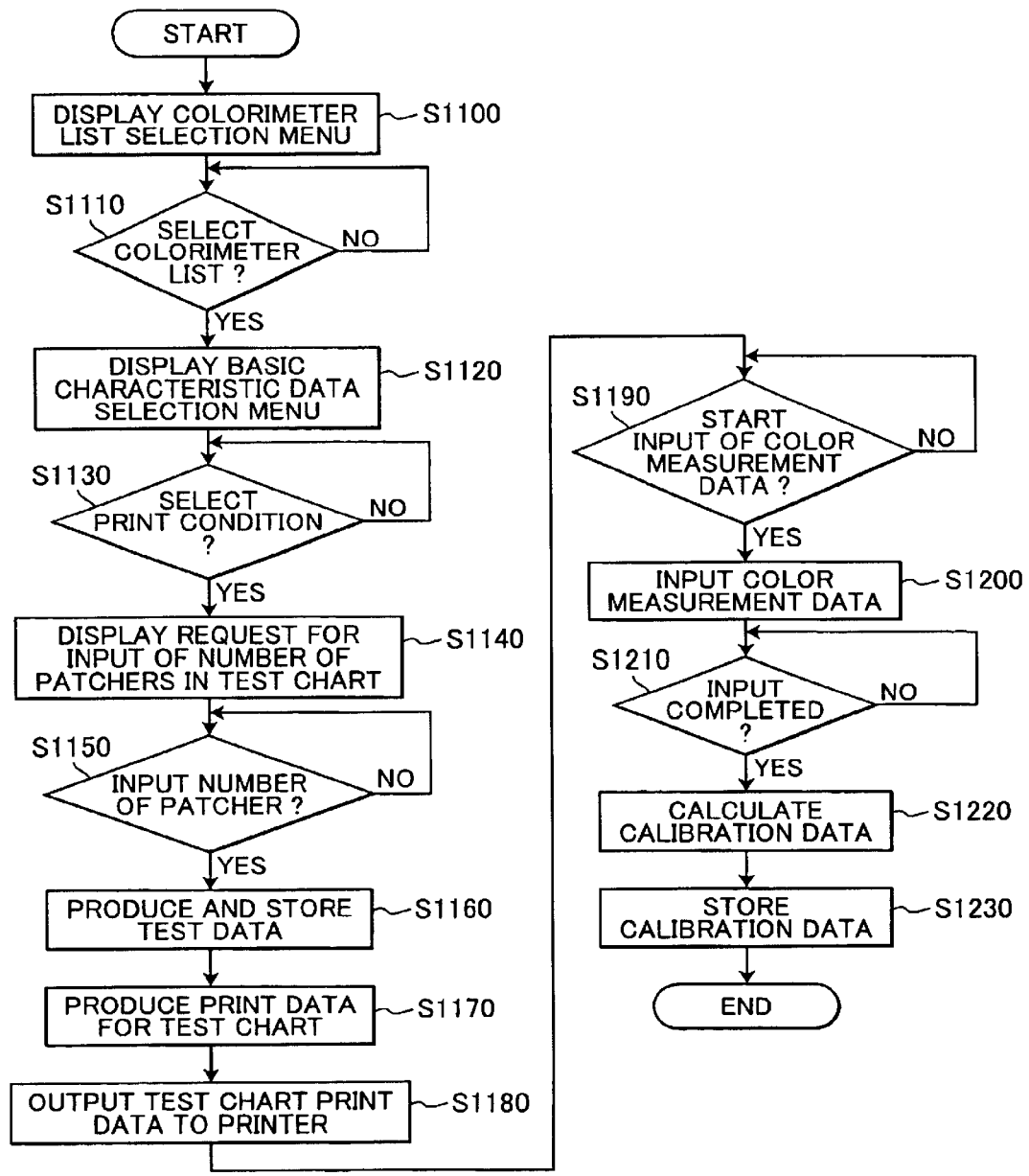
FIG. 18 is a flowchart representing a calibration data updating program according to the third embodiment.

As shown in FIG. 18, at the start of the calibration data setting process, first in S1100, the colorimeter list 140 is retrieved from the HDD 116 and written into the RAM 114. The colorimeter list 140 is converted into image data used to control the monitor 134 to display a colorimeter list selection menu on the monitor 134.

Next, in S1110, the CPU 110 waits for the user to select a particular colorimeter by judging whether or not the user has used the colorimeter list selection menu displayed on the monitor 34 to select one colorimeter.

It is noted that the colorimeter list selection menu can be designed to show the name of different colorimeters, only. In such a case, when the user selects the name of a particular colorimeter to use, then the CPU 110 determines that the user selects one colorimeter of the selected name.

When the user selects some colorimeter (yes in S1110), then the program proceeds S1120, whereupon the basic characteristics data 142 is retrieved from the HDD 116 and written into the RAM 114. The retrieved basic characteristic data 142 is converted into image data for displaying on the monitor 34 and a basic characteristic selection menu is displayed on the monitor 34 accordingly.

The basic characteristic selection menu enables the user to set his/her desired print conditions appropriate for the present situation. For example, the user can use the basic characteristic data selection menu to select normal paper as the type of recording medium, photoink as the type of ink, 600 dpi as resolution, and spiral dither method as the method for representing gradation.

Next, in S1130, the CPU 110 waits for the user to select his/her desired printing conditions by judging whether or not the user has set printing conditions by using the basic characteristic selection menu displayed on the monitor 34.

Once the user sets the printing conditions (yes in S1130), one lookup table 144 corresponding to the printing conditions set in S1130 is retrieved from the HDD 116 and written into the RAM 114.

Then, the program proceeds to S1140, whereupon the CPU 110 controls the monitor 34 to display a patch number indication menu, thereby enabling the user to designate how many patches he or she wishes to the test chart to include for each donor.

Next, in S1150, the CPU 110 waits for the user to set a number of patches in, by judging whether or not the user has used the patch number indication menu to input a number of patches. Once the user inputs his/her desired number of patches "n", then the program proceeds to S1160 whereupon the CPU 110 calculates a set of test data for printing a test chart and stores the test data in the RAM 114.

During the process of S1160, the CPU 110 calculates a relative density value Cj (=R, G, or B) for each of the designated number of patches to be produced, and calculates a pixel value i(Cj (=R, G, or B)) that should be applied to the printer 136 to print the corresponding patch.

More specifically, in the process of S1160, first, the CPU 110 calculates a number K using the following formula:

$$K=(C255-C0)/(n-1).$$

This formula is for uniformly dividing, by the number (n−1), the difference (C255−C0) between the maximum relative density value C255 and the minimum relative density value C0 in the lookup table 144 of FIG. 17(*a*). The CPU 110 performs this calculation for each color in the selected lookup table 144.

Next, based on the calculated number K, the CPU 110 calculates relative density values Cj for all the patches of each color by calculating the following formula:

$$Cj=K \times L$$

where integers of 0 to (n−1) are selected as "L".

Then, the CPU 110 refers to the dot gain curve for each color (FIG. 17(*a*)) to obtain a pixel, value i (Cj) that corresponds to each of the calculated relative density values Cj. One pixel value i(Cj) is thus determined as an input level Din (where D=R, G, B) that should be applied to the printer 136 in order to control the printer 136 to reproduce the corresponding relative density value Cj.

It is noted that in S1150, the user has to designate, as the patch number "n", an integer number equal to or greater than three (3). When the user designates the patch number "n" of 3, for example, the CPU 110 calculates, for each color, three relative density values C0, C128, and C255, and calculates three pixel values i(Cj) that respectively correspond to the relative density values C0, C128, and C255.

It is also noted that in the example of FIG. 17(*a*), the dot gain curve for blue (B) has the lowest value Cmin higher than C0, and has the highest value Cmax lower than C255. In such a case, the CPU 110 calculates the value K by the following formula:

$$K=(Cmax-Cmin)/(n-1)$$

In other words, the CPU 110 calculates the value K by uniformly dividing the difference (Cmax−Cmin) between the maximum value Cmax and the minimum value Cmin of the relative density C by the number (n−1).

Then, the CPU 110 calculates relative density values Cj' by the following formula:
$$Cj'=K \times L$$

where integers of 0 to (n−1) are selected as "L".

Then, the relative density values Cj are calculated by the following formula:

$$Cj=Cj'+Cmin$$

That is, the CPU 110 calculates the relative density values Cj by adding the minimum value Cmin to values Cj'.

When the relative density values Cj and corresponding pixel values j(Cj) and thus determined for printing all the patches in each color in S1160, the determined values Cj and i(Cj) are given a correspondence with patch numbers (P1 to P(3n) starting from the smallest patch number and working upward in order as shown in FIG. 19. The values Cj and i(Cj) are then stored in the RAM 114 together with data of coordinates (x, y), for the respective patches, which are retrieved from the colorimeter list 140 for the colorimeter that the user has selected as S1110. Thus, the values Cj and i(Cj) and the patch coordinate values (x, y) for all the patches of all the colors are stored in the RAM 114 as a set of test data 146 for printing a test chart. It is noted that FIG. 19 represents an example of the test data 146 that is produced when the number of five (5) is inputted for the patch number "n" in S1150. In this case, a total of 15 (=3×n) sets of data, each data set including values Cj and i(Cj) and coordinate values (x, y), are set for patch numbers P1 to P 15, where patch numbers P1–P5 are for red color, patch numbers P6–P10 are for green color, and patch numbers P11–P15 are for blue color.

When the test data 146 is thus completely produced, then the program proceeds to S1170, whereupon the test data 146 is converted into a print format that the printer 136 can use to print patches on a recording sheet. Then in S1180, the print data is outputted to the printer 136.

Then, the printer 136 prints a test chart on a user's desired print sheet under the print conditions set by the user. The user then operates the colorimeter 138 to measure the colors of the printed test chart to obtain color measurement data Dout (where D=R, G, B). The color measurement data Dout obtained from the test chart is then inputted from the colorimeter 138 into the personal computer 200.

In S1190, the CPU 110 waits for the color measurement data Dout to be inputted from the colorimeter 138. Once the color measurement data Dout starts to be inputted (yes in S1190), then the program proceeds to S1200 and retrieval of the color measurement data Dout is started.

In S1210, the CPU 110 waits for retrieval of the color measurement data Dout to be completed. The CPU 110 determines whether the retrieval of color measurement data Dout has been completed by judging whether or not input of the color measurement data Dout has finished or not. Once retrieval of the color measurement data has been completed (yes in S12310), then the program proceeds to S1220 whereupon the CPU 110 calculates calibration data for the presently-set printing conditions, based on the color measurement data Dout retrieved in S1200 and the test data 146 determined in S1160.

More specifically, in S1220, the CPU 110 calculates the calibration data 140 in the same manner as in the first and second embodiments. That is, the CPU 11 first performs interpolation between the obtained color measurement data Dout (where D=R, G, B) to determine all the density levels that will be obtained by the printer 36 in response to all the 256 input levels Din (where D=R, G, B) of "0" to "255". More specifically, because actual output levels Dout are obtained in S1200 only for input levels Din of the user's designated number, output levels Dout for other input levels are estimated by interpolating between the obtained actual output levels Dout.

Once output levels Dout have been completely obtained in correspondence with all the 256 input levels Din (where D=R, G, B) of 0–255, the CPU 11 calculates which input level Din (where D=R, G, B) should be applied to the printer 2 in order to reproduce each of the output tone levels Dout of 0–255. The CPU 11 performs this calculation for each of the three colors (R, G, B). As a result, 256 input levels Din (where D=R, G, B) are determined, for each color, as values that are capable of controlling the printer 2 to reproduce the respective tone levels Dout of 0–255. Then, under the assumption that a tone Dout obtained by the printer 136 has a linear relationship with an original tone level $D_{original}$ (where D=R, G, B), the CPU 110 arranges, as shown in FIG. 17(b), the 256 numerical values Din that should be applied to the printer 136 to reproduce the tones Dout of 0–256 in correspondence with original numerical values $D_{original}$ of 0–255.

The thus newly-obtained calibration data 150 indicates the relationship between the input levels Din (or pixel values i) and the original tone levels $D_{original}$ (or relative densities C) to be reproduced by the printer 136 in response to the pixel value i. This relationship is indicated by a dotted line in FIG. 17(a). If the characteristic of the printer 136 changes from when the calibration data preparation process (FIG. 18) is executed at the latest, the obtained graph (dotted line in FIG. 17(a)) differs from the original graph (solid line) that is obtained during the latest-performed calibration data preparation process. The CPU 110 therefore creates a new set of test data or lookup table 114 that shows the newly-produced graph (dotted line) of FIG. 17(a) that corresponds to the newly-produced calibration data of FIG. 17(b).

After producing the calibration data 150 and the lookup table 144 in S1220, then, in S1230, the CPU 110 writes the newly-produced calibration data 150, which corresponds to the present printing conditions and to the present characteristic of the printer 136, over calibration data 150 that has been prepared during the latest-performed calibration data preparation operation for the same printing condition and that has been stored in the HDD 116. Thus, the HDD 116 can always store the most recently-produced calibration data 150 for each set of printing condition.

Simultaneously, the CPU 110 writes the newly-produced lookup table 144, which corresponds to the present characteristic of the printer 136 in correspondence with the presently-set printing condition, over the lookup table 144 that has been prepared during the latest-performed calibration data preparation operation for the same printing condition and that has been stored in the HDD 116. Thus, the HDD 116 can always store also the most recently-produced lookup table 144 for each set of printing condition. Then, the routine is completed.

Thus, according to the present embodiment, the calibration data 150 and the lookup table 144 are both updated every time when the calibration data preparation process of FIG. 18 is performed. The thus updated calibration data 150 will be used during a printing operation that is performed thereafter for the corresponding printing condition. The updated lookup table 144 will be used as basic test data during a calibration data preparation operation performed thereafter for the corresponding printing condition.

When printing is performed thereafter, the image formation program shown in FIG. 20 is retrieved from the ROM 112, and is executed by the CPU 110.

During the printing process, the user first designates, in S2130, a print condition in terms of the medium type, ink type, print resolution, and area gradation method. In response to the input of the user's designation, the CPU 110 retrieves, in S2131, one set of calibration data 50 that corresponds to the user's designated print conditions. Then, in S2132, the CPU 11 receives original tone level data $D_{original}$ (where D=R, G, B) included in image data, supplied from a desired upper rank program, and converts the original level data $D_{original}$ (where D=R, G, B) into input level data Din (where D=R, G, B) using the retrieved calibration data. Then, in S2133, the CPU 11 outputs the input level data Din (where D=R, G, B) to the printer 136, thereby allowing the printer 136 to print the tone level designated by the original level data Din (where D=R, G, B). That is, if tone levels are measured from a print output actually obtained by the printer 136, the measured tone levels Dout (where D=R, G, B) will properly match the original tone levels Din (where D=R, G, B).

As described above, the personal computer 200 uses calibration data to convert original image data Din into image formation data Dout that corresponds to the printer 136. The personal computer 200 can reliably and accurately set the calibration data according to printing conditions of the printer 136 and to enable using an optical colorimeter 138 when setting the calibration data. The personal computer stores the colorimeter list 140 that lists data for forming test charts appropriate for a variety of different types of colorimeters and the basic characteristic data 142 that corresponds to a variety of print conditions. The personal computer 200 produces test data 146 based on the colorimeter list data 140 and the basic characteristic data 142 by urging the user to select the colorimeter 138 to use, printing conditions of the printer 136, and the number of patches to be printed in the test chamber (S1100 to S1150). Then, the printer 136 is controlled by the test data 146 to print a test chart (S1160 to S1180). When color measurement data is inputted from the colorimeter 138, then the calibration data is calculated using the color measurement data and stored for being used to convert image data (S1190 to S1230). Thus, calibration data that corresponds to the present printing condition can be set using the user's desired colorimeter.

According to the present embodiment, as described above, the HDD 116 stores the basic characteristic data 142 including basic test data for a plurality of printing conditions and the colorimeter list 140 including patch position data for a plurality of types of colorimeters. The user can therefore control the computer 200 to produce test data 146 according to the type of the colorimeter 56 used and to the printing conditions on the printer 136.

In order to update the calibration data, the user can control the printer 136 to print out a test chart that is most appropriate for the printing conditions of the printer 136 and for the colorimeter 138 used for measurement. By measuring color of the test chart using the colorimeter 138, the calibration data can be set according to the printing conditions of the printer 136 selected at that time.

Because the colorimeter list 140 includes data for various types of colorimeters 38, the user can control the printer 136 to print a test chart suitable for the user's own colorimeter 138. The user does not need to purchase any new colorimeter for the measurement of the test chart.

Because the basic characteristic data 142 includes data for various types of printing conditions, the computer 200 can produce calibration data that is optimum for the user's set printing conditions of the printer 136. Therefore, reproducibility of the printer 136 can be enhanced.

Additionally, the number of patches to be printed on the test chart can be changed as appropriate. Therefore, for example, when only a short amount of time is allowed for updating the calibration data, the amount of time required to update calibration data can be reduced by reducing the number of patches to print. The time for updating the calibration data can be changed according to the convenience of the user. The printer can be handled easily by the user as a result.

In the above description, every time when the calibration data preparation process is executed, both the calibration data 150 and the lookup table data 144 are updated. However, only the calibration data 150 may be updated, but each lookup table 144 may not be updated. Each lookup table 144 may be designed to include one fixed set of standard test data that has been determined by performing the calibration data preparation process before the system 200 is shipped from the manufacturer.

In the above-described embodiment, the HDD 116 stores both the basic characteristic data file 142 and the colorimeter list file 140. However, it is sufficient that the HDD 116 stores the colorimeter list file 140 only. In such a case, the HDD 116 has to store a single set of basic test data 144 for a single standard printing condition. The user can use the colorimeter list file 140 to print a test chart that corresponds to the user's colorimeter. The user can therefore use his/her own colorimeter without needing to buy a new one.

It is also sufficient that the HDD 116 stores the basic characteristic data file 142 only. In this case, the HDD 116 has to store a single set of data indicative of patch coordinates, and the like corresponding to a single standard type colorimeter. The user can use the basic characteristic data file 142 to produce a test chart that properly matches the user's set image forming conditions of the printer 136. The test chart is measured by the standard type colorimeter, and calibration data is newly produced.

Or, the HDD 116 stores either of the colorimeter list file 140 or the basic characteristic data file 142 together with a patch number designation program that corresponds to the process of S1160 and that is executed, upon input of the user's designation of the number of patches (yes in S1150), to produce the values Cj and i(Cj) for printing patches of the designated number in the same manner as described above.

For example, if the HDD 116 stores the colorimeter list file 140 and the patch number designation program, then the computer 200 can produce test data that can print patches of the designated number at locations (x, y) suitable for the user's selected colorimeter 138. For this reason, if the user designates less than the predetermined number (256) of patches for each color, then the printer 136 can print a test chart in a size smaller than the normal test charts shown in FIGS. 14(a)–14(c). Calibration data can still be reliably produced.

When the HDD 116 stores the basic characteristic data 142 and the patch number designation program, then the computer 200 can produce test data that can print patches of the designated number in color tones suitable for the user's set printing conditions. For this reason, if the user designates less than the predetermined number (256) of patches for each color, then the printer 136 can print a test chart in a size smaller than the normal test charts shown in FIGS. 14(a)–14(c). Because the computer 200 can control the printer 136 to print a test chart that appropriately corresponds to the user's dot image forming conditions, the computer 200 can produce calibration data that properly reflects the condition of the printer 136.

In the above-described embodiment, when calibration data is produced for some printing conditions, the calibration data is stored in the HDD 116 for that printing conditions. Accordingly, the HDD 116 can store a plurality of sets of calibration data 150 for the plurality of sets of printing conditions, respectively. However, the HDD 116 may store only one set of calibration data for the most recently-set printing conditions. Or, the HDD 116 may be allowed to store a predetermined number of calibration data sets of maximum. Other calibration data can be erased. With this configuration, the memory area taken up in the HDD 116 by other calibration data can be reduced.

In the above description, the computer 200 has a function of both an image processing device and a calibration setting device. That is, the computer 200 can operate to set calibration data and to convert image data Din, from an upper rank program, into image formation data Dout using the calibration data. However, the function of the calibration data setting device can be incorporated into the image forming device, such as the printer or a copy machine, itself.

While the invention has been described in detail with reference to the specific embodiments thereof, it would be apparent to those skilled in the art that various changes and modifications may be made therein without departing from the spirit of the invention.

For example, in the above-described embodiments, the calibration data is produced for the printer. However, the calibration data can be produced for other types of image formation devices such as a display. In such a case, the display is controlled by the input tone levels Din to form a plurality of color patches, and the formed color patches are measured to obtain output levels Dout. Based on the obtained measurement values Dout and the input levels Din, the calibration data is produced.

What is claimed is:

1. A tone characteristic data producing device for producing tone characteristic data of an image formation device, the tone characteristic data producing device, comprising:

an input unit that inputs data of a plurality of input levels to an image formation device, thereby controlling the image formation device to produce a plurality of tone patches;

a measurement control unit that controls a tone measurement device to measure tone of at least two tone patches among the plurality of tone patches, thereby producing data of at least two output levels indicative of the measured tone of the at least two tone patches;

a characteristic data production unit that produces tone characteristic data based on relationship between the at least two output levels and corresponding input levels; and a memory storing a standard tone characteristic data, wherein the measurement control unit includes a judgment unit that judges, for each tone patch, whether a shift, defined between the measured output level and a corresponding standard output level that is obtained based on the standard tone characteristic data, is within a predetermined range.

2. A tone characteristic data producing device as claimed in claim 1, wherein the characteristic data production unit stores, in the memory, the tone characteristic data produced in each characteristic data producing operation, and wherein the measurement control unit retrieves, for a present characteristic data producing operation, a set of tone characteristic data that has been produced by the tone characteristic data production unit in the latest characteristic data producing operation as the standard tone characteristic data.

3. A tone characteristic data producing device as claimed in claim 1, wherein the standard tone characteristic data is stored in the memory before the tone characteristic data producing device is shipped from a manufacturer.

4. A tone characteristic data producing device as claimed in claim 1, wherein the measurement control unit further includes a warning unit that issues a warning when the shift is judged to be out of the predetermined range.

5. A tone characteristic data producing device as claimed in claim 1, wherein the tone characteristic data production unit includes:

output level selecting unit that selects, when the shift obtained for one tone patch is judged to be out of the predetermined range, output levels that are obtained by two tone patches, whose corresponding input levels have values sandwiching an input level for the subject tone patch; and a calculating unit that calculates an output level for the subject tone patch by interpolating between the selected two output levels.

6. A tone characteristic data producing device as claimed in claim 1, wherein the input unit inputs a predetermined number of input levels to the image formation device, the predetermined number of input levels including a predetermined lowest input level and a predetermined highest input level, thereby causing the image formation device to form the predetermined number of tone patches, further comprising a patch number control unit that controls the measurement control unit to cause the measurement device to measure at least tone patches corresponding to the predetermined lowest and highest input levels among the predetermined number of tone patches to produce output levels corresponding to at least the lowest and highest input levels, while allowing the measurement control unit to stop control of the measurement device to measure the tone patches after the measurement device measures the tone patches corresponding to the predetermined lowest and highest input levels, and wherein the characteristic data production unit produces the tone characteristic data by using the measured output levels and corresponding input levels and by interpolating between the measured output levels to calculate output levels for unmeasured patch.

7. A tone characteristic data producing device as to claimed in claim 1, wherein the image formation device includes a printer.

8. A tone characteristic data producing device for producing tone characteristic data of an image formation device, the tone characteristic data producing device, comprising:

an input unit that inputs data of a plurality of input levels to an image formation device, thereby controlling the image formation device to produce a plurality of tone patches;

a measurement control unit that controls a tone measurement device to measure tone of at least two tone patches among the plurality of tone patches, thereby producing data of at least two output levels indicative of the measured tone of the at least two tone patches;

a characteristic data production unit that produces tone characteristic data based on relationship between the at least two output levels and corresponding input levels; and a patch number control unit that controls the number of tone patches to be measured by the tone measurement device, wherein the input unit inputs a predetermined number of input levels, for each of a plurality of colors, to the image formation device, thereby controlling the image formation device to form the predetermined number of tone patches for each color, and further inputs a single lowest input level for all the colors to the image formation device, thereby controlling the image formation device to form a single tone patch common to all the colors, wherein the patch number control unit controls the measurement control unit to cause the measurement device to measure, for each color, the predetermined number of tone patches that correspond to the predetermined number of input levels, thereby producing the predetermined number of output levels, and to measure the single one tone patch that commonly corresponds to the lowest input levels for all the colors, thereby producing a single common output level, and wherein the characteristic data production unit produces, for each color, tone characteristic data based on the predetermined number of input levels and the predetermined number of corresponding output levels and based on the lowest input levels and the single common output level.

9. A tone characteristic data producing device for producing tone characteristic data of an image formation device, comprising:

an input unit that inputs data of a plurality of input levels to an image formation device, thereby controlling the image formation device to produce a plurality of tone patches;

a measurement control unit that controls a tone measurement device to measure tone of at least two tone patches among the plurality of tone patches, thereby producing data of at least two output levels indicative of the measured tone of the at least two tone patches;

a characteristic data production unit that produces tone characteristic data based on relationship between the at least two output levels and corresponding input levels; and a patch number control unit that controls the number of tone patches to be measured by the tone measurement device;

wherein the input unit inputs a predetermined number of input levels to the image formation device, the predetermined number of input levels including a predetermined lowest level and a predetermined highest input level, thereby causing the image formation device to form the predetermined number of tone patches, wherein the patch number control unit controls the measurement control unit to cause the measurement device to measure at least tone patches corresponding to the predetermined lowest and highest input levels among the predetermined number of tone patches to produce output levels corresponding to at least the lowest and highest input levels, while allowing the measurement control unit to stop control of the measurement device to measure the tone patches after the measurement device measures the tone patches corresponding to the predetermined lowest and highest input levels, and wherein the characteristic data production unit produces the tone characteristic data by using the measured output levels and corresponding input levels and by interpolating between the measured output levels to calculate output levels for unmeasured patch, wherein the input unit inputs a predetermined "n" number of different input density levels to the image formation device, thereby controlling the image formation device to form the predetermined "n" number of tone patches corresponding to the "n" number of input density levels, wherein "n" is an integer greater than or equal to three (3), wherein the measurement control unit controls the tone measurement device to successively measure the "n" number of tone patches from a first measurement operation to a n-th measurement operation in an order that either one of the tone patches for the highest and lowest input levels be measured in a "m"-th measurement operation among the total "n" tone patches, where m is an integer greater than or equal to two (2) and smaller than n, and that the other one of the tone patches be measured in a measuring operation conducted prior to the m-th measuring operation, wherein the patch number control unit controls the measurement control unit to cause the measurement device to perform the first to m-th measurement operation, while allowing the measurement control unit to stop control of the measurement after the measurement device performs the m-th measurement operation.

10. A tone characteristic data producing device as claimed in claim 9, wherein the input unit successively inputs the n number of input levels in a predetermined order through first through n-th input operations so that the image formation device forms the n tone patches including first through n-th tone patches in the same order and so that the tone measurement device measures at least two tone patches among the n tone patches in the same order, the input unit inputting either one of the highest and lowest input levels in the first input operation and inputting the other one of the highest and lowest input levels in the second input operation, thereby allowing the image formation device to produce each of first and second patches based on either one of the highest and lowest input levels, the input unit inputting input levels for producing $(2^k+2)$-th through $(2^{k+1}+1)$-th tone patches so that each of the input levels has a value between a corresponding adjacent two input levels for the first through $(2^k+1)$-th tone patches when the input levels for the first through $(2^k+1)$-th tone patches are arranged in an order of their magnitudes, where k is an integer greater than or equal to zero (0).

11. A tone characteristic data producing device as claimed in claim 9, wherein the input unit inputs, for each of several colors, the n number of input levels to the image formation device, thereby allowing the image formation device to produce the n number of tone patches for each color, the measurement control unit controlling the tone measurement device to measure, for each color, at least first through m-th tone patches, the characteristic data producing unit producing tone characteristic data, for each color, based on to the measured tone patches of the corresponding color.

12. A tone characteristic data producing device as claimed in claim 9, wherein the input unit inputs, for a single color, the n number of input levels to the image formation device, thereby allowing the image formation device to produce the n number of tone patches for the single color, the measurement control unit controlling the tone measurement device to measure, for the single color, at least first through m-th tone patches, the characteristic data producing unit producing tone characteristic data, for the single color, based on the measured tone patches.

13. A tone characteristic data producing device for producing tone characteristic data of an image formation device, the tone characteristic data producing device, comprising:

an input unit that inputs data of a plurality of input levels to an image formation device, thereby controlling the image formation device to produce a plurality of tone patches;

a measurement control unit that controls a tone measurement device to measure tone of at least two tone patches among the plurality of tone patches, thereby producing data of at least two output levels indicative of the measured tone of the at least two tone patches;

a characteristic data production unit that produces tone characteristic data based on relationship between the at least two output levels and corresponding input levels; and a patch number control unit that controls the number of tone patches to be measured by the tone measurement device, wherein the patch number control unit includes a designation unit that enables a user to designate a desired number of patches to produce, wherein the input unit inputs the designed number of input levels to the image formation device, thereby producing the designated number of tone patches, wherein the measurement control unit controls the measurement device to measure the designated number of tone patches, thereby producing the designated number of output levels, and wherein the characteristic data production unit produces the tone characteristic data based on the designated number of input levels and the corresponding designated number of output levels.

14. A tone characteristic data producing device as claimed in claim 13, further comprising:
- a memory storing a plurality of sets of test data, each test data set including the plurality of input levels to be inputted to the image formation device; and
- a selecting unit that selects one set of test data, produces the designated number of input levels based on the selected test data set, and inputs the produced input levels to the image formation device, thereby allowing the image formation device to produce the plurality of tone patches.

15. A tone characteristic data producing device as claimed in claim 14, wherein the plurality of sets of test data correspond to a plurality of different tone measurement device.

16. A tone characteristic data producing device as claimed in claim 14, wherein the plurality of sets of test data correspond to a plurality of different image forming conditions used at the image formation device.

17. A tone characteristic data producing device as claimed in claim 13, further comprising a tone conversion unit that converts an original tone level into an input tone level to be inputted to the image formation device according to the produced tone characteristic data.

18. A data recording medium storing a tone characteristic data producing program for being read by a computer system to control the computer system to produce tone characteristic data of an image formation device, the program comprising:

- a program of inputting data of a plurality of input levels to an image formation device, thereby controlling the image formation device to produce a plurality of tone patches;
- a program of controlling a tone measurement device to measure tone of at least two tone patches among the plurality of tone patches, thereby producing data of at least two output levels indicative of the measured tone of the at least two tone patches; and
- a program of producing tone characteristic data based on relationship between the at least two output levels and corresponding input levels,
- wherein the measurement control program includes a judgment program of judging, for each tone patch, whether a shift, defined between the measured output level and a corresponding standard output level that is obtained based on the standard tone characteristic data, is within a predetermined range.

* * * * *